(12) United States Patent
Ding et al.

(10) Patent No.: US 10,358,506 B2
(45) Date of Patent: Jul. 23, 2019

(54) DUAL CATALYST SYSTEM FOR PRODUCING LLDPE COPOLYMERS WITH IMPROVED PROCESSABILITY

(71) Applicant: Chevron Phillips Chemical Company LP, The Woodlands, TX (US)

(72) Inventors: Errun Ding, Bartlesville, OK (US); Chung C. Tso, Bartlesville, OK (US); Randall S. Muninger, Dewey, OK (US); Qing Yang, Bartlesville, OK (US); Youlu Yu, Bartlesville, OK (US); Yongwoo Inn, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 15/723,225

(22) Filed: Oct. 3, 2017

(65) Prior Publication Data

US 2019/0100606 A1 Apr. 4, 2019

(51) Int. Cl.
| | |
|---|---|
| *C08F 4/653* | (2006.01) |
| *C08F 4/6592* | (2006.01) |
| *C08F 210/16* | (2006.01) |
| *C08L 23/08* | (2006.01) |
| *C08F 4/6192* | (2006.01) |
| *C08F 4/64* | (2006.01) |
| *C08F 10/02* | (2006.01) |
| *C08F 4/659* | (2006.01) |

(52) U.S. Cl.
CPC .............. *C08F 4/6192* (2013.01); *C08F 4/64* (2013.01); *C08F 4/65904* (2013.01); *C08F 10/02* (2013.01); *C08F 210/16* (2013.01); *C08L 23/0815* (2013.01); *C08F 4/6592* (2013.01); *C08F 4/65927* (2013.01); *C08F 2500/01* (2013.01); *C08L 2207/068* (2013.01)

(58) Field of Classification Search
CPC .............. C08F 210/16; C08F 4/65904; C08F 4/65925; C08F 4/65927; C08L 23/0815
See application file for complete search history.

(56) References Cited

U.S. PATENT DOCUMENTS

| | | |
|---|---|---|
| 3,242,099 A | 3/1966 | Manyik et al. |
| 3,248,179 A | 4/1966 | Norwood |
| 4,501,885 A | 2/1985 | Sherk et al. |
| 4,588,790 A | 5/1986 | Jenkins, III et al. |
| 4,794,096 A | 12/1988 | Ewen |
| 4,808,561 A | 2/1989 | Welborn, Jr. |
| 5,272,236 A | 12/1993 | Lai et al. |
| 5,352,749 A | 10/1994 | DeChellis et al. |
| 5,436,304 A | 7/1995 | Griffin et al. |
| 5,565,175 A | 10/1996 | Hottovy et al. |
| 5,575,979 A | 11/1996 | Hanson |
| 5,576,259 A | 11/1996 | Hasegawa et al. |
| 5,807,938 A | 9/1998 | Kaneko et al. |
| 5,847,053 A | 12/1998 | Chum et al. |
| 5,919,983 A | 7/1999 | Rosen et al. |
| 6,107,230 A | 8/2000 | McDaniel et al. |
| 6,165,929 A | 12/2000 | McDaniel et al. |
| 6,239,235 B1 | 5/2001 | Hottovy et al. |
| 6,262,191 B1 | 7/2001 | Hottovy et al. |
| 6,294,494 B1 | 9/2001 | McDaniel et al. |
| 6,300,271 B1 | 10/2001 | McDaniel et al. |
| 6,316,553 B1 | 11/2001 | McDaniel et al. |
| 6,355,594 B1 | 3/2002 | McDaniel et al. |
| 6,376,415 B1 | 4/2002 | McDaniel et al. |
| 6,388,017 B1 | 5/2002 | McDaniel et al. |
| 6,391,816 B1 | 5/2002 | McDaniel et al. |
| 6,395,666 B1 | 5/2002 | McDaniel et al. |
| 6,524,987 B1 | 2/2003 | Collins et al. |
| 6,548,441 B1 | 4/2003 | McDaniel et al. |
| 6,548,442 B1 | 4/2003 | McDaniel et al. |
| 6,576,583 B1 | 6/2003 | McDaniel et al. |
| 6,613,712 B1 | 9/2003 | McDaniel et al. |
| 6,632,894 B1 | 10/2003 | McDaniel et al. |
| 6,667,274 B1 | 12/2003 | Hawley et al. |
| 6,750,302 B1 | 6/2004 | McDaniel et al. |
| 6,833,415 B2 | 12/2004 | Kendrick et al. |
| 6,908,968 B2 | 6/2005 | Jain et al. |
| 7,026,494 B1 | 4/2006 | Yang et al. |
| 7,041,617 B2 | 5/2006 | Jensen et al. |
| 7,226,886 B2 | 6/2007 | Jayaratne et al. |
| 7,294,599 B2 | 11/2007 | Jensen et al. |
| 7,312,283 B2 | 12/2007 | Martin et al. |
| 7,517,939 B2 | 4/2009 | Yang et al. |
| 7,531,606 B2 | 5/2009 | Hendrickson |
| 7,598,327 B2 | 10/2009 | Shaw |
| 7,601,665 B2 | 10/2009 | McDaniel et al. |
| 7,619,047 B2 | 11/2009 | Yang et al. |
| 7,884,163 B2 | 2/2011 | McDaniel et al. |
| 8,114,946 B2 | 2/2012 | Yang et al. |
| 8,242,221 B2 | 8/2012 | McDaniel et al. |

(Continued)

FOREIGN PATENT DOCUMENTS

| | | |
|---|---|---|
| EP | 2931763 B1 | 1/2018 |
| EP | 3041873 B1 | 11/2018 |

(Continued)

OTHER PUBLICATIONS

U.S. Appl. No. 15/345,586, filed Nov. 8, 2016 entitled "Dual Catalyst System for Producing LLDPE Copolymers with a Narrow Molecular Weight Distribution and Improved Processability".

(Continued)

*Primary Examiner* — Caixia Lu
(74) *Attorney, Agent, or Firm* — Merchant & Gould P.C.

(57) ABSTRACT

Disclosed herein are ethylene-based polymers generally characterized by a density from 0.89 to 0.93 g/cm$^3$, a ratio of Mw/Mn from 3 to 6.5, a Mz from 200,000 to 650,000 g/mol, a CY-a parameter at 190° C. from 0.2 to 0.4, and a reverse short chain branching distribution. The ATREF profile of these polymers can have a high temperature peak from 92 to 102° C., and a low temperature peak from 18 to 36° C. less than that of the high temperature peak. These polymers can have comparable physical properties to that of a metallocene-catalyzed LLDPE, but with improved processability, shear thinning, and melt strength, and can be used in blown film and other end-use applications.

20 Claims, 11 Drawing Sheets

(56) References Cited

U.S. PATENT DOCUMENTS

| | | | |
|---|---|---|---|
| 8,309,485 | B2 | 11/2012 | Yang et al. |
| 8,309,748 | B2 | 11/2012 | Ding et al. |
| 8,475,899 | B2 | 7/2013 | Yang et al. |
| 8,501,654 | B2 | 8/2013 | Murray et al. |
| 8,623,973 | B1 | 1/2014 | McDaniel et al. |
| 8,759,246 | B2 | 6/2014 | Ding et al. |
| 8,822,608 | B1 | 9/2014 | Bhandarkar et al. |
| 8,829,125 | B2 | 9/2014 | Ding et al. |
| 8,865,846 | B2 | 10/2014 | Ding et al. |
| 9,023,959 | B2 | 5/2015 | McDaniel et al. |
| 9,156,970 | B2 | 10/2015 | Hlavinka et al. |
| 9,181,370 | B2 * | 11/2015 | Sukhadia ............... C08F 210/16 |
| 9,273,159 | B2 | 3/2016 | Ding et al. |
| 9,441,061 | B2 | 9/2016 | Tso et al. |
| 2014/0213735 | A1 | 7/2014 | Demirors et al. |
| 2016/0340454 | A1 * | 11/2016 | Funk ..................... C08F 210/16 |
| 2016/0347891 | A1 | 12/2016 | Lam et al. |
| 2017/0008984 | A1 | 1/2017 | Ding et al. |

FOREIGN PATENT DOCUMENTS

| | | |
|---|---|---|
| WO | 2017053375 A1 | 3/2017 |
| WO | 2018128698 A2 | 7/2018 |

OTHER PUBLICATIONS

Arnett et al., entitled "*Zero-Shear Viscosity of Some Ethyl Branched Paraffinic Model Polymers*," J. Phys. Chem. 1980, 84, pp. 649-652.

Bird et al., entitled "*Dynamics of Polymeric Liquids*," Fluid Mechanics, 2nd Ed., John Wiley & Sons (1987), vol. 1, 3 pages.

*Film Extrusion Manual—Process, Materials, Properties*, TAPPI Press, 1992, 13 pages.

Hieber et al., entitled "*Some Correlations Involving the Sear Viscosity of Polystyrene Melts*," Rheol. Acta, 28, (1989), pp. 321-332.

Hieber et al., entitled "*Shear-Rate-Dependence Modeling of Polymer Melt Viscosity*," Polym. Eng. Sci., (1992), vol. 32, pp. 931-938.

Janzen et al., entitled "*Diagnosing Long-Chain Branching in Polyethylenes*," J. Mol. Struct., pp. 485-486, 569-584 (1999).

*Modern Plastics Encyclopedia*, Mid-Nov. 1995 Issue, vol. 72, No. 12, 3 pages.

Yu et al., entitled "*Long Chain Branches in Metallocene-Catalyzed Polyethylene Determined by a Combination of SEC/Multi-Angle Light Scattering, NMR and Rheology*," Polymer Preprint, 44, pp. 49-50, (2003).

International Search Report issued in corresponding PCT Application PCT/US2018/052509, dated Jan. 22, 2019, 4 pages.

* cited by examiner

DUAL CATALYST SYSTEM FOR PRODUCING LLDPE COPOLYMERS WITH IMPROVED PROCESSABILITY

BACKGROUND OF THE INVENTION

Polyolefins such as high density polyethylene (HDPE) homopolymer and linear low density polyethylene (LLDPE) copolymer can be produced using various combinations of catalyst systems and polymerization processes. Ziegler-Natta and chromium-based catalyst systems can, for example, produce ethylene polymers having good extrusion processability and polymer melt strength and bubble stability in blown film applications, typically due to their broad molecular weight distribution (MWD). Metallocene based catalyst systems can, for example, produce ethylene polymer having good impact strength, tear resistance, and optical properties, but often at the expense of poor extrusion processability, melt strength, and bubble stability.

In some end-uses, such as blown film applications, it can be beneficial to have the properties of a metallocene-catalyzed LLDPE copolymer, but with improved processability, shear thinning, melt strength, and bubble stability. Accordingly, it is to these ends that the present invention is generally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

The present invention generally relates to ethylene polymers (e.g., comprising an ethylene/α-olefin copolymer) characterized by a density in a range from about 0.89 to about 0.93 g/cm$^3$, a ratio of Mw/Mn in a range from about 3 to about 6.5, a Mz in a range from about 200,000 to about 650,000 g/mol, a CY-a parameter at 190° C. in a range from about 0.2 to about 0.4, and a number of short chain branches (SCB's) per 1000 total carbon atoms of the polymer at Mz that is greater than at Mn. Additionally or alternatively, the ethylene polymer (e.g., comprising an ethylene/α-olefin copolymer) can have an ATREF profile characterized by a first peak and second peak, with the second peak at a temperature from about 92 to about 102° C., and the first peak at a temperature from about 18 to about 36° C. less than that of the second peak; and from about 0.1 to about 8 wt. % of the polymer eluted below a temperature of 40° C., greater than about 45 wt. % of the polymer eluted between 40 and 76° C., less than about 36 wt. % of the polymer eluted between 76 and 86° C., and from about 1 to about 26 wt. % of the polymer eluted above a temperature of 86° C.

These polymers, in further aspects, can be characterized by an IB parameter in a range from about 1.1 to about 1.4 (or from about 1.15 to about 1.35), and/or a melt index (MI) in a range from about 0.2 to about 10 g/10 min (or from about 0.5 to about 5 g/10 min), and/or a ratio of HLMI/MI in a range from about 20 to about 50 (or from about 28 to about 42), and/or a Mw in a range from about 80,000 to about 200,000 g/mol (or from about 85,000 to about 170,000 g/mol), and/or a ratio of Mz/Mw in a range from about 2 to about 6 (or from about 2.4 to about 5.5), and/or a Mn in a range from about 10,000 to about 40,000 g/mol (or from about 17,000 to about 36,000 g/mol), and/or a zero-shear viscosity in a range from about 2000 to about 35,000 Pa-sec (or from about 3000 to about 25,000 Pa-sec), and/or a unimodal molecular weight distribution, and/or less than 0.01 long chain branches (or less than 0.007 long chain branches) per 1000 total carbon atoms.

These ethylene polymers can be used to produce various articles of manufacture, such as films (e.g., blown films), sheets, pipes, geomembranes, and molded products.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects and embodiments may be directed to various feature combinations and sub-combinations described in the detailed description.

DEFINITIONS

Figure 1:
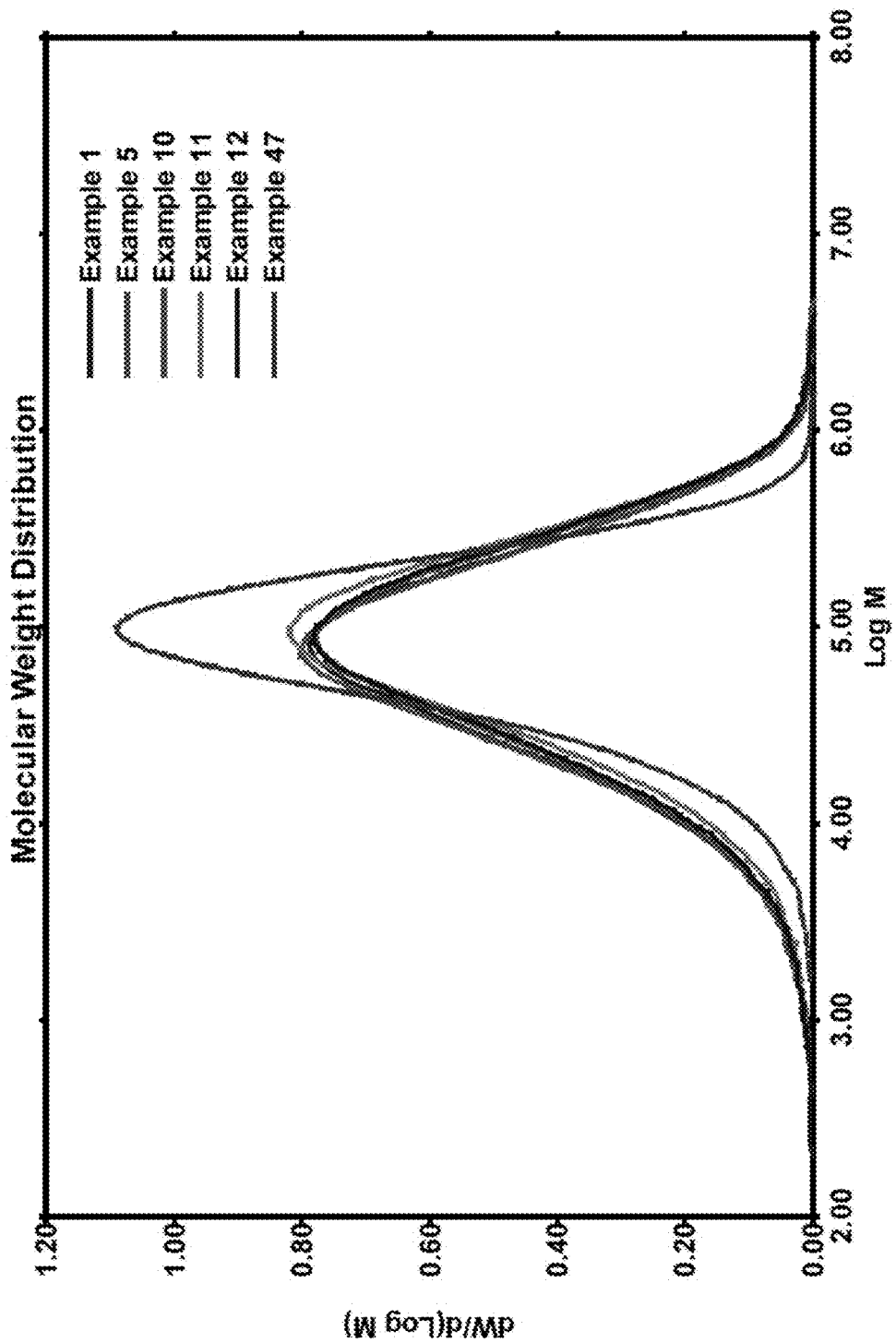
FIG. 1 presents a plot of the molecular weight distributions of the polymers of Examples 1, 5, 10-12, and 47.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and/or feature disclosed herein, all combinations that do not detrimentally affect the designs, compositions, processes, and/or methods described herein are contemplated with or without explicit description of the particular combination. Additionally, unless explicitly recited otherwise, any aspect and/or feature disclosed herein can be combined to describe inventive features consistent with the present disclosure.

While compositions and methods are described herein in terms of "comprising" various components or steps, the compositions and methods can also "consist essentially of" or "consist of" the various components or steps, unless stated otherwise. For example, a catalyst composition consistent with aspects of the present invention can comprise; alternatively, can consist essentially of; or alternatively, can consist of; catalyst component I, catalyst component II, an activator, and a co-catalyst.

The terms "a," "an," "the," etc., are intended to include plural alternatives, e.g., at least one, unless otherwise specified. For instance, the disclosure of "an activator-support" or "a metallocene compound" is meant to encompass one, or mixtures or combinations of more than one, activator-support or metallocene compound, respectively, unless otherwise specified.

Generally, groups of elements are indicated using the numbering scheme indicated in the version of the periodic table of elements published in *Chemical and Engineering News,* 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

For any particular compound disclosed herein, the general structure or name presented is also intended to encompass all structural isomers, conformational isomers, and stereoisomers that can arise from a particular set of substituents, unless indicated otherwise. Thus, a general reference to a compound includes all structural isomers unless explicitly indicated otherwise; e.g., a general reference to pentane includes n-pentane, 2-methyl-butane, and 2,2-dimethylpropane, while a general reference to a butyl group includes an n-butyl group, a sec-butyl group, an iso-butyl group, and a tert-butyl group. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

The term "substituted" when used to describe a group, for example, when referring to a substituted analog of a particular group, is intended to describe any non-hydrogen moiety that formally replaces a hydrogen in that group, and is intended to be non-limiting. A group or groups can also be referred to herein as "unsubstituted" or by equivalent terms such as "non-substituted," which refers to the original group in which a non-hydrogen moiety does not replace a hydrogen within that group. Unless otherwise specified, "substituted" is intended to be non-limiting and include inorganic substituents or organic substituents as understood by one of ordinary skill in the art.

The term "hydrocarbon" whenever used in this specification and claims refers to a compound containing only carbon and hydrogen. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Non-limiting examples of hydrocarbyl groups include alkyl, alkenyl, aryl, and aralkyl groups, amongst other groups.

The term "polymer" is used herein generically to include olefin homopolymers, copolymers, terpolymers, and the like, as well as alloys and blends thereof. The term "polymer" also includes impact, block, graft, random, and alternating copolymers. A copolymer is derived from an olefin monomer and one olefin comonomer, while a terpolymer is derived from an olefin monomer and two olefin comonomers. Accordingly, "polymer" encompasses copolymers and terpolymers derived from any olefin monomer and comonomer(s) disclosed herein. Similarly, the scope of the term "polymerization" includes homopolymerization, copolymerization, and terpolymerization. Therefore, an ethylene polymer would include ethylene homopolymers, ethylene copolymers (e.g., ethylene/$\alpha$-olefin copolymers), ethylene terpolymers, and the like, as well as blends or mixtures thereof. Thus, an ethylene polymer encompasses polymers often referred to in the art as LLDPE (linear low density polyethylene) and HDPE (high density polyethylene). As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer could be categorized an as ethylene/1-hexene copolymer. The term "polymer" also includes all possible geometrical configurations, unless stated otherwise, and such configurations can include isotactic, syndiotactic, and random symmetries. Moreover, unless stated otherwise, the term "polymer" also is meant to include all molecular weight polymers, and is inclusive of lower molecular weight polymers or oligomers.

The term "co-catalyst" is used generally herein to refer to compounds such as aluminoxane compounds, organoboron or organoborate compounds, ionizing ionic compounds, organoaluminum compounds, organozinc compounds, organomagnesium compounds, organolithium compounds, and the like, that can constitute one component of a catalyst composition, when used, for example, in addition to an activator-support. The term "co-catalyst" is used regardless of the actual function of the compound or any chemical mechanism by which the compound may operate.

The terms "chemically-treated solid oxide," "treated solid oxide compound," and the like, are used herein to indicate a solid, inorganic oxide of relatively high porosity, which can exhibit Lewis acidic or Brønsted acidic behavior, and which has been treated with an electron-withdrawing component, typically an anion, and which is calcined. The electron-withdrawing component is typically an electron-withdrawing anion source compound. Thus, the chemically-treated solid oxide can comprise a calcined contact product of at least one solid oxide with at least one electron-withdrawing anion source compound. Typically, the chemically-treated solid oxide comprises at least one acidic solid oxide compound. The "activator-support" of the present invention can be a chemically-treated solid oxide. The terms "support" and "activator-support" are not used to imply these components are inert, and such components should not be construed as an inert component of the catalyst composition. The term "activator," as used herein, refers generally to a substance that is capable of converting a metallocene component into a catalyst that can polymerize olefins, or converting a contact product of a metallocene component and a component that provides an activatable ligand (e.g., an alkyl, a hydride) to the metallocene, when the metallocene compound does not already comprise such a ligand, into a catalyst that can polymerize olefins. This term is used regardless of the actual activating mechanism. Illustrative activators include activator-supports, aluminoxanes, organoboron or organoborate compounds, ionizing ionic compounds, and the like. Aluminoxanes, organoboron or organoborate compounds, and ionizing ionic compounds generally are referred to as activators if used in a catalyst composition in which an activator-support is not present. If the catalyst composition contains an activator-support, then the aluminoxane, organoboron or organoborate, and ionizing ionic materials are typically referred to as co-catalysts.

The term "metallocene" as used herein describes compounds comprising at least one $\eta^3$ to $\eta^5$-cycloalkadienyl-type moiety, wherein $\eta^3$ to $\eta^5$-cycloalkadienyl moieties include cyclopentadienyl ligands, indenyl ligands, fluorenyl ligands, and the like, including partially saturated or substituted derivatives or analogs of any of these. Possible substituents on these ligands can include H, therefore this invention comprises ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like. In some contexts, the metallocene is referred to simply as the "catalyst," in much the same way the term "co-catalyst" is used herein to refer to, for example, an organoaluminum compound.

The terms "catalyst composition," "catalyst mixture," "catalyst system," and the like, do not depend upon the actual product or composition resulting from the contact or reaction of the initial components of the disclosed or claimed catalyst composition/mixture/system, the nature of the active catalytic site, or the fate of the co-catalyst, the metallocene compound, the half-metallocene compound, or the activator (e.g., activator-support), after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, may be used interchangeably throughout this disclosure.

The term "contact product" is used herein to describe compositions wherein the components are contacted together in any order, in any manner, and for any length of time, unless otherwise specified. For example, the components can be contacted by blending or mixing. Further, contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another. Similarly, the term "contacting" is used herein to refer to materials which can be blended, mixed, slurried, dissolved, reacted, treated, or otherwise combined in some other manner.

Although any methods, devices, and materials similar or equivalent to those described herein can be used in the practice or testing of the invention, the typical methods, devices, and materials are herein described.

All publications and patents mentioned herein are incorporated herein by reference for the purpose of describing and disclosing, for example, the constructs and methodologies that are described in the publications, which might be used in connection with the presently described invention.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein. For example, when a chemical moiety having a certain number of carbon atoms is disclosed or claimed, the intent is to disclose or claim individually every possible number that such a range could encompass, consistent with the disclosure herein. For example, the disclosure that a moiety is a $C_1$ to $C_{18}$ hydrocarbyl group, or in alternative language, a hydrocarbyl group having from 1 to 18 carbon atoms, as used herein, refers to a moiety that can have 1, 2, 3, 4, 5, 6, 7, 8, 9, 10, 11, 12, 13, 14, 15, 16, 17, or 18 carbon atoms, as well as any range between these two numbers (for example, a $C_1$ to $C_8$ hydrocarbyl group), and also including any combination of ranges between these two numbers (for example, a $C_2$ to $C_4$ and a $C_{12}$ to $C_{16}$ hydrocarbyl group).

Similarly, another representative example follows for the ratio of Mz/Mw of an ethylene polymer consistent with aspects of this invention. By a disclosure that the ratio of Mw/Mn can be in a range from about 3 to about 6.5, the intent is to recite that the ratio of Mw/Mn can be any ratio in the range and, for example, can be equal to about 3, about 3.5, about 4, about 4.5, about 5, about 5.5, about 6, or about 6.5. Additionally, the ratio of Mw/Mn can be within any range from about 3 to about 6.5 (for example, from about 3.5 to about 5.5), and this also includes any combination of ranges between about 3 and about 6.5 (for example, the Mw/Mn ratio can be in a range from about 3 to about 4, or from about 5 to about 6). Likewise, all other ranges disclosed herein should be interpreted in a manner similar to these examples.

The term "about" means that amounts, sizes, formulations, parameters, and other quantities and characteristics are not and need not be exact, but can be approximate and/or larger or smaller, as desired, reflecting tolerances, conversion factors, rounding off, measurement errors, and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities. The term "about" can mean within 10% of the reported numerical value, preferably within 5% of the reported numerical value.

DETAILED DESCRIPTION OF THE INVENTION

The present invention is directed generally to ethylene-based polymers having excellent strength and toughness properties, but with improved processability and shear thinning. Articles produced from these ethylene-based polymers, such as blown films, can have excellent dart impact, tear strength, and optical properties, but can be processed more easily and with better melt strength than traditional metallocene-catalyzed LLDPE resins.

Ethylene Polymers

Generally, the polymers disclosed herein are ethylene-based polymers, or ethylene polymers, encompassing homopolymers of ethylene as well as copolymers, terpolymers, etc., of ethylene and at least one olefin comonomer. Comonomers that can be copolymerized with ethylene often can have from 3 to 20 carbon atoms in their molecular chain. For example, typical comonomers can include, but are not limited to, propylene, 1-butene, 1-pentene, 1-hexene, 1-heptene, 1-octene, and the like, or combinations thereof. In an aspect, the olefin comonomer can comprise a $C_3$-$C_{18}$ olefin; alternatively, the olefin comonomer can comprise a $C_3$-$C_{10}$ olefin; alternatively, the olefin comonomer can comprise a $C_4$-$C_{10}$ olefin; alternatively, the olefin comonomer can comprise a $C_3$-$C_{10}$ α-olefin; alternatively, the olefin comonomer can comprise a $C_4$-$C_{10}$ α-olefin; alternatively, the olefin comonomer can comprise 1-butene, 1-hexene, 1-octene, or any combination thereof or alternatively, the comonomer can comprise 1-hexene. Typically, the amount of the comonomer, based on the total weight of monomer (ethylene) and comonomer, can be in a range from about 0.01 to about 20 wt. %, from about 0.1 to about 10 wt. %, from about 0.5 to about 15 wt. %, from about 0.5 to about 8 wt. %, or from about 1 to about 15 wt. %.

In one aspect, the ethylene polymer of this invention can comprise an ethylene/α-olefin copolymer, while in another aspect, the ethylene polymer can comprise an ethylene homopolymer, and in yet another aspect, the ethylene polymer of this invention can comprise an ethylene/α-olefin copolymer and an ethylene homopolymer. For example, the ethylene polymer can comprise an ethylene/1-butene copolymer, an ethylene/1-hexene copolymer, an ethylene/1-octene copolymer, an ethylene homopolymer, or any combination thereof; alternatively, an ethylene/1-butene copolymer, an ethylene/1-hexene copolymer, an ethylene/1-octene copolymer, or any combination thereof; or alternatively, an ethylene/1-hexene copolymer.

An illustrative and non-limiting example of an ethylene polymer (e.g., comprising an ethylene copolymer) of the present invention can have a density in a range from about 0.89 to about 0.93 g/cm³, a ratio of Mw/Mn in a range from about 3 to about 6.5, a Mz in a range from about 200,000 to about 650,000 g/mol, a CY-a parameter at 190° C. in a range from about 0.2 to about 0.4, and a number of short chain branches (SCB's) per 1000 total carbon atoms of the polymer at Mz that is greater than at Mn. Additionally or alternatively, the ethylene polymer can have an ATREF profile characterized by a first peak and second peak, with the second peak at a temperature from about 92 to about 102° C., and the first peak at a temperature from about 18 to about 36° C. less than that of the second peak; and from about 0.1 to about 8 wt. % of the polymer eluted below a temperature of 40° C., greater than about 45 wt. % of the polymer eluted between 40 and 76° C., less than about 36 wt. % of the polymer eluted between 76 and 86° C., and from about 1 to about 26 wt. % of the polymer eluted above a temperature of 86° C. These illustrative and non-limiting examples of ethylene polymers consistent with the present invention also can have any of the polymer properties listed below and in any combination, unless indicated otherwise.

The densities of ethylene-based polymers disclosed herein often are less than or equal to about 0.93 g/cm³, for example, less than or equal to about 0.928 g/cm³, or less than or equal to about 0.925 g/cm³. Yet, in particular aspects, the density can be in a range from about 0.89 to about 0.93 g/cm³, from about 0.895 to about 0.928 g/cm³, from about 0.902 to about 0.928 g/cm³, from about 0.902 to about 0.922 g/cm³, from about 0.895 to about 0.925 g/cm³, or from about 0.905 to about 0.924 g/cm³.

While not being limited thereto, ethylene polymers described herein often can have a melt index (MI) in a range from about 0.2 to about 10 g/10 min, from about 0.3 to about 8 g/10 min, or from about 0.3 to about 6 g/10 min. In further aspects, ethylene polymers described herein can have a melt index (MI) in a range from about 0.4 to about 6 g/10 min, from about 0.4 to about 3 g/10 min, from about 0.5 to about 6 g/10 min, from about 0.5 to about 5 g/10 min, from about 0.5 to about 4 g/10 min, or from about 0.5 to about 2 g/10 min.

The ratio of high load melt index (HLMI) to melt index (MI), referred to as the ratio of HLMI/MI, is not particularly limited, but typically ranges from about 25 to about 55, from about 20 to about 50, from about 30 to about 52, from about 25 to about 45, from about 28 to about 42, or from about 30 to about 40.

In an aspect, ethylene polymers described herein can have a ratio of Mw/Mn, or the polydispersity index, in a range from about 3 to about 10, from about 3 to about 6.5, from about 3 to about 6, from about 3.2 to about 6.5, from about 3.8 to about 9.8, or from about 3.5 to about 5.5. In another aspect, ethylene polymers described herein can have a Mw/Mn in a range from about 3.2 to about 6.2, from about 3.5 to about 6.2, from about 3.2 to about 5.8, or from about 3.5 to about 6.

In an aspect, ethylene polymers described herein can have a ratio of Mz/Mw in a range from about 2 to about 6, from about 2 to about 5, or from about 2 to about 4. In another aspect, ethylene polymers described herein can have a Mz/Mw in a range from about 2.2 to about 5, from about 2.4 to about 5.5, from about 2.4 to about 4.2, or from about 2.5 to about 3.8.

In an aspect, ethylene polymers described herein can have a weight-average molecular weight (Mw) in a range from about 80,000 to about 200,000 g/mol, from about 80,000 to about 180,000 g/mol, or from about 85,000 to about 200,000 g/mol. In another aspect, ethylene polymers described herein can have a Mw in a range from about 80,000 to about 160,000 g/mol, from about 85,000 to about 185,000 g/mol, from about 85,000 to about 170,000 g/mol, or from about 87,000 to about 162,000 g/mol.

In an aspect, ethylene polymers described herein can have a number-average molecular weight (Mn) in a range from about 8,000 to about 40,000 g/mol, from about 10,000 to about 40,000 g/mol, from about 11,000 to about 39,000 g/mol, or from about 15,000 to about 35,000 g/mol. In another aspect, ethylene polymers described herein can have a Mn in a range from about 15,000 to about 40,000 g/mol, from about 17,000 to about 36,000 g/mol, or from about 17,000 to about 33,000 g/mol.

In an aspect, ethylene polymers described herein can have a z-average molecular weight (Mz) in a range from about 200,000 to about 650,000 g/mol, from about 200,000 to about 600,000 g/mol, from about 210,000 to about 575,000 g/mol, or from about 220,000 to about 445,000 g/mol. In another aspect, ethylene polymers described herein can have a Mz in a range from about 200,000 to about 525,000 g/mol, from about 210,000 to about 600,000 g/mol, from about 250,000 to about 550,000 g/mol, or from about 250,000 to about 450,000 g/mol.

In accordance with certain aspects of this invention, the IB parameter from a molecular weight distribution curve (plot of dW/d(Log M) vs. Log M; normalized to an area equal to 1) can be an important characteristic of the ethylene polymers described herein. The IB parameter is often referred to as the integral breadth, and is defined as $1/[dW/d(\text{Log } M)]_{MAX}$, and is useful to describe a polymer having a relatively narrow molecular weight distribution with a small fraction of both high molecular weight and low molecular weight tails. Often, the IB parameter of the ethylene polymers consistent with this invention can be in a range from about 1.1 to about 1.4, from about 1.15 to about 1.4, or from about 1.19 to about 1.3. In one aspect, the ethylene polymer can be characterized by an IB parameter in a range from about 1.1 to about 1.35, and in another aspect, from about 1.15 to about 1.35, and in yet another aspect, from about 1.1 to about 1.3, and in still another aspect, from about 1.17 to about 1.33.

In accordance with certain aspects of this invention, the ethylene polymers described herein can have a unique ATREF curve or profile. For instance, the ethylene polymer can a first peak and second peak (in the 55-105° C. range), with the second peak at a temperature from about 92 to about 102° C., and the first peak at a temperature from about 18 to about 36° C. less than that of the second peak. Further, the ATREF curve or profile can be characterized by from about 0.1 to about 8 wt. % of the polymer eluted below a temperature of 40° C., greater than about 45 wt. % of the polymer eluted between 40 and 76° C., less than about 36 wt. % of the polymer eluted between 76 and 86° C., and from about 1 to about 26 wt. % of the polymer eluted above a temperature of 86° C.

In some aspects, the temperature of the first peak (the lower temperature peak) can be in a range from about 58 to about 82° C., from about 60 to about 80° C., from about 61 to about 79° C., or from about 62 to about 78° C. In these and other aspects, the temperature of the second peak (the higher temperature peak) can be in a range from about 92 to about 102° C., about 93 to about 102° C., from about 92 to about 100° C., from about 93 to about 100° C., from about 94 to about 99° C., or from about 95 to about 98° C. The peak ATREF temperature (the temperature of the highest peak on the ATREF curve) can be either the lower temperature peak or the higher temperature peak.

While not being limited thereto, the difference between the temperatures of the first peak and the second peak (ΔT)—or stated another way, the difference between the lower temperature peak and the higher temperature peak—often can be in a range from about 18 to about 36° C., or from about 19 to about 36° C.; or alternatively, from about 18 to about 35° C., or from about 20 to about 34° C.

In the ATREF test, generally from about 0.1 to about 8 wt. % of the polymer is eluted below a temperature of 40° C., greater than about 45 wt. % of the polymer is eluted between 40 and 76° C., less than about 36 wt. % of the polymer is eluted between 76 and 86° C., and from about 1 to about 26 wt. % of the polymer is eluted above a temperature of 86° C. As one of skill in the art would readily recognize, the total of these fractions does not exceed 100 wt. %.

Consistent with aspects of this invention, the amount of the polymer eluted below a temperature of 40° C. can be from about 0.5 to about 7 wt. %, from about 1 to about 8 wt. %, from about 1 to about 7 wt. %, or from about 2 to about 6 wt. %. Additionally or alternatively, the amount of the polymer eluted between 40 and 76° C. can be greater than or equal to about 47 wt. %, greater than or equal to about 50 wt. %, from about 46 to about 90 wt. %, from about 46 to about 86 wt. %, from about 48 to about 88 wt. %, or from about 50 to about 86 wt. %. Additionally or alternatively, the amount of the polymer eluted between 76 and 86° C. can be less than or equal to about 35 wt. %, less than or equal to about 33 wt. %, from about 2 to about 35 wt. %, from about 4 to about 35 wt. %, from about 10 to about 35 wt. %, from about 3 to about 34 wt. %, or from about 5 to about 33 wt. %. Additionally or alternatively, the amount of the polymer eluted above a temperature of 86° C. can be from about 1 to about 25 wt. %, from about 1 to about 24 wt. %, from about 2 to about 26 wt. %, from about 2 to about 25 wt. %, or from about 3 to about 24 wt. %.

In some aspects, ethylene polymers described herein can have a zero-shear viscosity at 190° C. in a range from about 2000 to about 35,000 Pa-sec, from about 2000 to about 30,000 Pa-sec, from about 2000 to about 20,000 Pa-sec, from about 2600 to about 21,000 Pa-sec, from about 3000 to about 25,000 Pa-sec, or from about 3000 to about 18,000 Pa-sec. Moreover, these ethylene polymers can have a CY-a parameter in a range from about 0.2 to about 0.4, from about 0.2 to about 0.39, from about 0.22 to about 0.39, from about 0.24 to about 0.39, from about 0.2 to about 0.38, from about 0.24 to about 0.38, or from about 0.26 to about 0.41. The zero-shear viscosity and the CY-a parameter are determined from viscosity data measured at 190° C. and using the Carreau-Yasuda (CY) empirical model as described herein.

The ethylene polymers typically have low levels of long chain branches (LCB's). For instance, the ethylene polymer can contain less than 0.01 long chain branches (LCB's), less than 0.009 LCB's, less than 0.008 LCB's, less than 0.007 LCB's, less than 0.005 LCB's, or less than 0.003 LCB's, per 1000 total carbon atoms.

Moreover, the ethylene polymers typically have a reverse short chain branching distribution (reverse SCBD; increasing comonomer distribution). A reverse SCBD can be characterized by the number of short chain branches (SCB's) per 1000 total carbon atoms of the ethylene polymer at Mw that is greater than at Mn, and/or the number of SCB's per 1000 total carbon atoms of the ethylene polymer at Mz that is greater than at Mw, and/or the number of SCB's per 1000 total carbon atoms of the ethylene polymer at Mz that is greater than at Mn.

Generally, ethylene polymers consistent with certain aspects of the invention can have a unimodal molecular weight distribution (as determined using gel permeation chromatography (GPC) or other suitable analytical technique). In a unimodal molecular weight distribution, there is a single identifiable peak.

In an aspect, the ethylene polymer described herein can be a reactor product (e.g., a single reactor product), for example, not a post-reactor blend of two polymers, for instance, having different molecular weight characteristics. As one of skill in the art would readily recognize, physical blends of two different polymer resins can be made, but this necessitates additional processing and complexity not required for a reactor product.

Articles and Products

Articles of manufacture can be formed from, and/or can comprise, the ethylene polymers of this invention and, accordingly, are encompassed herein. For example, articles which can comprise ethylene polymers of this invention can include, but are not limited to, an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product, outdoor play equipment, a pipe, a sheet or tape, a toy, or a traffic barrier, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers often are added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated herein by reference in their entirety. In some aspects of this invention, an article of manufacture can comprise any of ethylene polymers described herein, and the article of manufacture can be or can comprise a blown film.

In some aspects, the article produced from and/or comprising an ethylene polymer of this invention is a film product. For instance, the film can be a blown film or a cast film that is produced from and/or comprises any of the ethylene polymers disclosed herein. Such films also can contain one or more additives, non-limiting examples of which can include an antioxidant, an acid scavenger, an antiblock additive, a slip additive, a colorant, a filler, a processing aid, a UV inhibitor, and the like, as well as combinations thereof.

Also contemplated herein is a method for forming or preparing an article of manufacture comprising any ethylene polymer disclosed herein. For instance, a method can comprise (i) contacting a catalyst composition with ethylene and an olefin comonomer under polymerization conditions in a polymerization reactor system to produce an ethylene polymer, wherein the catalyst composition can comprise catalyst component I, catalyst component II, an activator (e.g., an activator-support comprising a solid oxide treated with an electron-withdrawing anion), and an optional co-catalyst (e.g., an organoaluminum compound); and (ii) forming an article of manufacture comprising the ethylene polymer. The forming step can comprise blending, melt processing, extruding, molding, or thermoforming, and the like, including combinations thereof.

Also contemplated herein is a method for making a film (e.g., a blown film, a cast film, etc.) comprising any ethylene polymer disclosed herein. For instance, the method can comprise melt processing the ethylene polymer through a die to form the film. Suitably, the die can be configured based on the film to be produced, for example, an annular blown film die to produce a blown film, a slot or cast film die to produce a cast film, and so forth. Moreover, any suitable means of melt processing can be employed, although extrusion typically can be utilized. As above, additives can be combined with the polymer in the melt processing step (extrusion step), such as antioxidants, acid scavengers, antiblock additives, slip additives, colorants, fillers, processing aids, UV inhibitors, and the like, as well as combinations thereof.

Films disclosed herein, whether cast or blown, can be any thickness that is suitable for the particular end-use application, and often, the average film thickness can be in a range from about 0.25 to about 250 mils, or from about 0.4 to about 20 mils. For certain film applications, typical average thicknesses can be in a range from about 0.25 to about 8 mils, from about 0.5 to about 8 mils, from about 0.8 to about 5 mils, from about 0.7 to about 2 mils, or from about 0.7 to about 1.5 mils.

In an aspect and unexpectedly, the films disclosed herein (e.g., blown films) can have dart impact strengths, MD (or TD) Elmendorf tear strengths, and optical properties (e.g., low haze) that are comparable to that of metallocene-based LLDPE's of similar melt index and density. Thus, the beneficial processability and melt strength features of the ethylene polymers disclosed herein can be achieved without sacrificing toughness and aesthetic properties normally associated with metallocene-based LLDPE's.

Catalyst Systems and Polymerization Processes

In accordance with some aspects of the present invention, the olefin polymer (e.g., the ethylene polymer) can be produced using a dual catalyst system. In these aspects, catalyst component I can comprise any suitable half-metallocene titanium compound or any half-metallocene titanium compound disclosed herein. Catalyst component II can comprise any suitable bridged metallocene compound or any bridged metallocene compound disclosed herein. The catalyst system can comprise any suitable activator or any activator disclosed herein, and optionally, any suitable co-catalyst or any co-catalyst disclosed herein.

Catalyst component I can comprise, in particular aspects of this invention, a half-metallocene titanium compound with a cyclopentadienyl group. The cyclopentadienyl group can be substituted or unsubstituted. In other aspects, catalyst component I can comprise a half-metallocene titanium compound with an indenyl group. The indenyl group can be substituted or unsubstituted.

Illustrative and non-limiting examples of half-metallocene titanium compounds suitable for use as catalyst component I can include the following compounds:

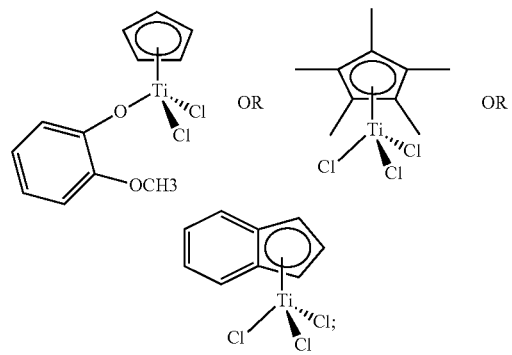

and the like, as well as combinations thereof.

Catalyst component I is not limited solely to the half-metallocene titanium compounds such as described above. Other suitable half-metallocene compounds are disclosed in U.S. Pat. Nos. 8,242,221, 8,309,748, 8,759,246, 8,865,846, 9,156,970, and 9,273,159, which are incorporated herein by reference in their entirety.

Generally, catalyst component II can comprise a bridged metallocene compound. In one aspect, for instance, catalyst component II can comprise a bridged zirconium or hafnium based metallocene compound. In another aspect, catalyst component II can comprise a bridged zirconium or hafnium based metallocene compound with an alkenyl substituent. In yet another aspect, catalyst component II can comprise a bridged zirconium or hafnium based metallocene compound with an alkenyl substituent and a substituted or unsubstituted fluorenyl group. In still another aspect, catalyst component II can comprise a bridged zirconium or hafnium based metallocene compound with a substituted or unsubstituted cyclopentadienyl group and a substituted or unsubstituted fluorenyl group, and with an alkenyl substituent on the bridging group and/or on the cyclopentadienyl group.

In some aspects, catalyst component II can comprise a bridged metallocene compound having an alkyl and/or aryl group substituent on the bridging group, while in other aspects, catalyst component II can comprise a dinuclear bridged metallocene compound with an alkenyl linking group.
Illustrative and non-limiting examples of bridged metallocene compounds suitable for use as catalyst component II can include the following compounds (Me=methyl, Ph=phenyl; t-Bu=tert-butyl):
(14)
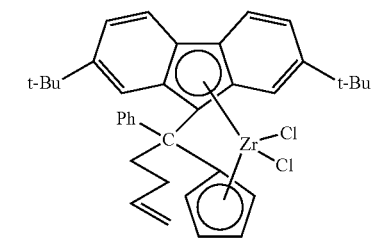
(15)
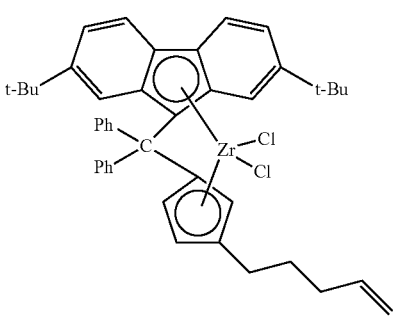
(16)
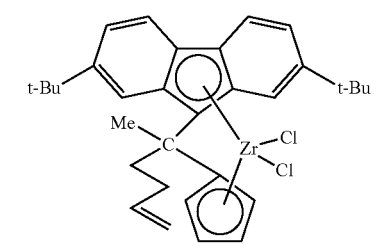
(17)
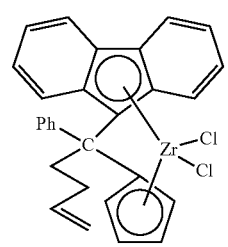
(18)
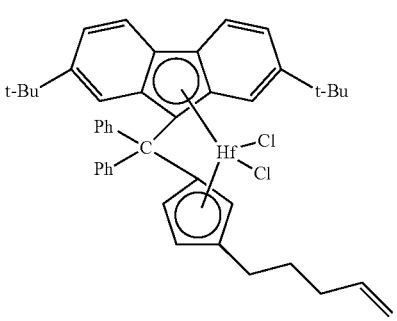
(19)
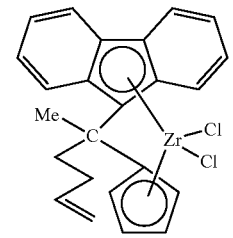
(20)
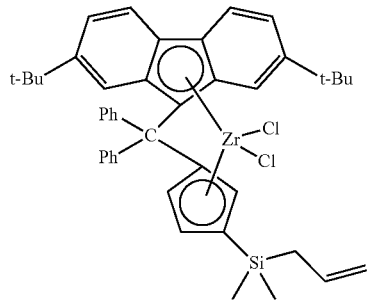
(21)
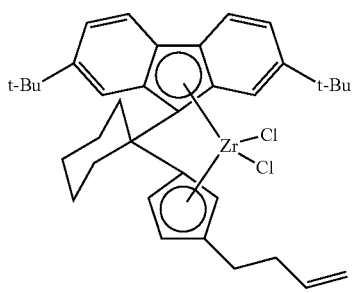
(22)
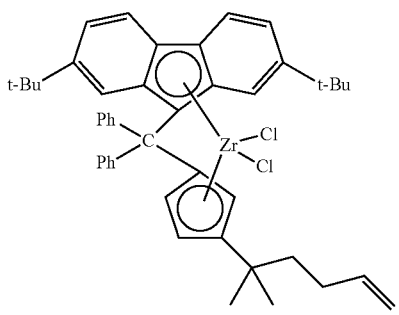
(23)
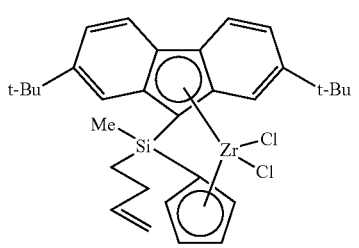

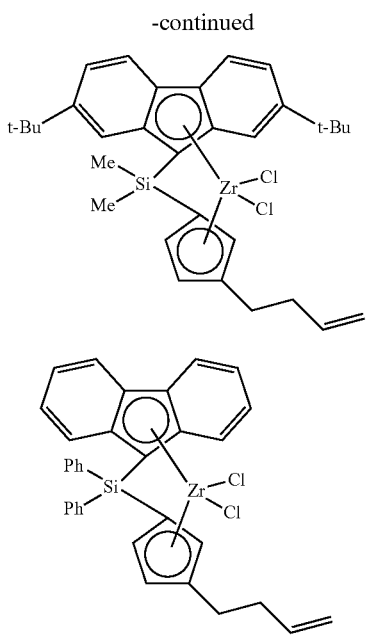

(24)

(25)

and the like, as well as combinations thereof.

Catalyst component II is not limited solely to the bridged metallocene compounds such as described above. Other suitable bridged metallocene compounds are disclosed in U.S. Pat. Nos. 7,026,494, 7,041,617, 7,226,886, 7,312,283, 7,517,939, and 7,619,047, which are incorporated herein by reference in their entirety.

According to an aspect of this invention, the weight ratio of catalyst component I to catalyst component II in the catalyst composition can be in a range from about 10:1 to about 1:10, from about 8:1 to about 1:8, from about 5:1 to about 1:5, from about 4:1 to about 1:4, from about 3:1 to about 1:3; from about 2:1 to about 1:2, from about 1.5:1 to about 1:1.5, from about 1.25:1 to about 1:1.25, or from about 1.1:1 to about 1:1.1.

Additionally, the dual catalyst system contains an activator. For example, the catalyst system can contain an activator-support, an aluminoxane compound, an organoboron or organoborate compound, an ionizing ionic compound, and the like, or any combination thereof. The catalyst system can contain one or more than one activator.

In one aspect, the catalyst system can comprise an aluminoxane compound, an organoboron or organoborate compound, an ionizing ionic compound, and the like, or a combination thereof. Examples of such activators are disclosed in, for instance, U.S. Pat. Nos. 3,242,099, 4,794,096, 4,808,561, 5,576,259, 5,807,938, 5,919,983, and 8,114,946, the disclosures of which are incorporated herein by reference in their entirety. In another aspect, the catalyst system can comprise an aluminoxane compound. In yet another aspect, the catalyst system can comprise an organoboron or organoborate compound. In still another aspect, the catalyst system can comprise an ionizing ionic compound.

In other aspects, the catalyst system can comprise an activator-support, for example, an activator-support comprising a solid oxide treated with an electron-withdrawing anion. Examples of such materials are disclosed in, for instance, U.S. Pat. Nos. 7,294,599, 7,601,665, 7,884,163, 8,309,485, 8,623,973, and 9,023,959, which are incorporated herein by reference in their entirety. For instance, the activator-support can comprise fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided-chlorided silica-coated alumina, fluorided silica-coated alumina, sulfated silica-coated alumina, or phosphated silica-coated alumina, and the like, as well as any combination thereof. In some aspects, the activator-support can comprise a fluorided solid oxide and/or a sulfated solid oxide.

Various processes can be used to form activator-supports useful in the present invention. Methods of contacting the solid oxide with the electron-withdrawing component, suitable electron withdrawing components and addition amounts, impregnation with metals or metal ions (e.g., zinc, nickel, vanadium, titanium, silver, copper, gallium, tin, tungsten, molybdenum, zirconium, and the like, or combinations thereof), and various calcining procedures and conditions are disclosed in, for example, U.S. Pat. Nos. 6,107,230, 6,165,929, 6,294,494, 6,300,271, 6,316,553, 6,355,594, 6,376,415, 6,388,017, 6,391,816, 6,395,666, 6,524,987, 6,548,441, 6,548,442, 6,576,583, 6,613,712, 6,632,894, 6,667,274, 6,750,302, 7,294,599, 7,601,665, 7,884,163, and 8,309,485, which are incorporated herein by reference in their entirety. Other suitable processes and procedures for preparing activator-supports (e.g., fluorided solid oxides, sulfated solid oxides, etc.) are well known to those of skill in the art.

The present invention can employ catalyst compositions containing catalyst component I, catalyst component II, an activator (one or more than one), and optionally, a co-catalyst. When present, the co-catalyst can include, but is not limited to, metal alkyl, or organometal, co-catalysts, with the metal encompassing boron, aluminum, zinc, and the like. Optionally, the catalyst systems provided herein can comprise a co-catalyst, or a combination of co-catalysts. For instance, alkyl boron, alkyl aluminum, and alkyl zinc compounds often can be used as co-catalysts in such catalyst systems. Representative boron compounds can include, but are not limited to, tri-n-butyl borane, tripropylborane, triethylborane, and the like, and this include combinations of two or more of these materials. While not being limited thereto, representative aluminum compounds (e.g., organoaluminum compounds) can include trim ethyl aluminum, tri ethyl aluminum, tri-n-propyl aluminum, tri-n-butylaluminum, triisobutylaluminum, tri-n-hexylaluminum, tri-n-octyl aluminum, diisobutylaluminum hydride, diethylaluminum ethoxide, diethylaluminum chloride, and the like, as well as any combination thereof. Exemplary zinc compounds (e.g., organozinc compounds) that can be used as co-catalysts can include, but are not limited to, dimethylzinc, diethylzinc, dipropylzinc, dibutylzinc, dineopentylzinc, di(trimethylsilyl)zinc, di(triethylsilyl)zinc, di(triisoproplysilyl)zinc, di(triphenylsilyl)zinc, di(allyldimethylsilyl)zinc, di(trimethylsilylmethyl)zinc, and the like, or combinations thereof. Accordingly, in an aspect of this invention, the dual catalyst composition can comprise catalyst component I, catalyst component II, an activator-support, and an organoaluminum compound (and/or an organozinc compound).

In another aspect of the present invention, a catalyst composition is provided which comprises catalyst component I, catalyst component II, an activator-support, and an organoaluminum compound, wherein this catalyst composition is substantially free of aluminoxanes, organoboron or organoborate compounds, ionizing ionic compounds, and/or other similar materials; alternatively, substantially free of aluminoxanes; alternatively, substantially free or organoboron or organoborate compounds; or alternatively, substantially free of ionizing ionic compounds. In these aspects, the catalyst composition has catalyst activity, discussed herein, in the absence of these additional materials. For example, a catalyst composition of the present invention can consist essentially of catalyst component I, catalyst component II, an activator-support, and an organoaluminum compound, wherein no other materials are present in the catalyst composition which would increase/decrease the activity of the catalyst composition by more than about 10% from the catalyst activity of the catalyst composition in the absence of said materials.

Catalyst compositions of the present invention generally have a catalyst activity greater than about 100 grams of ethylene polymer (homopolymer and/or copolymer, as the context requires) per gram of activator-support per hour (abbreviated g/g/hr). In another aspect, the catalyst activity can be greater than about 150, greater than about 250, or greater than about 500 g/g/hr. In still another aspect, catalyst compositions of this invention can be characterized by having a catalyst activity greater than about 550, greater than about 650, or greater than about 750 g/g/hr. Yet, in another aspect, the catalyst activity can be greater than about 1000 g/g/hr, greater than about 2000 g/g/hr, or greater than about 5000 g/g/hr, and often as high as 8000-15,000 g/g/hr. Illustrative and non-limiting ranges for the catalyst activity include from about 500 to about 10,000, from about 750 to about 7,500, or from about 1,000 to about 5,000 g/g/hr, and the like. These activities are measured under slurry polymerization conditions, with a triisobutylaluminum co-catalyst, using isobutane as the diluent, at a polymerization temperature of about 80° C. and a reactor pressure of about 320 psig. Moreover, in some aspects, the activator-support can comprise sulfated alumina, fluorided silica-alumina, or fluorided silica-coated alumina, although not limited thereto.

This invention further encompasses methods of making these catalyst compositions, such as, for example, contacting the respective catalyst components in any order or sequence. In one aspect, for example, the catalyst composition can be produced by a process comprising contacting, in any order, catalyst component I, catalyst component II, and the activator, while in another aspect, the catalyst composition can be produced by a process comprising contacting, in any order, catalyst component I, catalyst component II, the activator, and the co-catalyst.

Olefin polymers (e.g., ethylene polymers) can be produced from the disclosed catalyst systems using any suitable olefin polymerization process using various types of polymerization reactors, polymerization reactor systems, and polymerization reaction conditions. One such olefin polymerization process for polymerizing olefins in the presence of a catalyst composition of the present invention can comprise contacting the catalyst composition with an olefin monomer and optionally an olefin comonomer (one or more) in a polymerization reactor system under polymerization conditions to produce an olefin polymer, wherein the catalyst composition can comprise, as disclosed herein, catalyst component I, catalyst component II, an activator, and an optional co-catalyst. This invention also encompasses any olefin polymers (e.g., ethylene polymers) produced by any of the polymerization processes disclosed herein.

As used herein, a "polymerization reactor" includes any polymerization reactor capable of polymerizing (inclusive of oligomerizing) olefin monomers and comonomers (one or more than one comonomer) to produce homopolymers, copolymers, terpolymers, and the like. The various types of polymerization reactors include those that can be referred to as a batch reactor, slurry reactor, gas-phase reactor, solution reactor, high pressure reactor, tubular reactor, autoclave reactor, and the like, or combinations thereof; or alternatively, the polymerization reactor system can comprise a slurry reactor, a gas-phase reactor, a solution reactor, or a combination thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Polymerization reactor systems and processes also can include partial or full direct recycle of unreacted monomer, unreacted comonomer, and/or diluent.

A polymerization reactor system can comprise a single reactor or multiple reactors (2 reactors, more than 2 reactors, etc.) of the same or different type. For instance, the polymerization reactor system can comprise a slurry reactor, a gas-phase reactor, a solution reactor, or a combination of two or more of these reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both. Accordingly, the present invention encompasses polymerization reactor systems comprising a single reactor, comprising two reactors, and comprising more than two reactors. The polymerization reactor system can comprise a slurry reactor, a gas-phase reactor, a solution reactor, in certain aspects of this invention, as well as multi-reactor combinations thereof.

According to one aspect, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, 6,833,415, and 8,822,608, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used.

According to yet another aspect, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. Representative gas phase reactors are disclosed in U.S. Pat. Nos. 5,352,749, 4,588,790, 5,436,304, 7,531,606, and 7,598,327, each of which is incorporated by reference in its entirety herein.

According to still another aspect, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect, the polymerization reactor system can comprise a solution polymerization reactor wherein the monomer/comonomer are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

The polymerization reactor system can further comprise any combination of at least one raw material feed system, at least one feed system for catalyst or catalyst components, and/or at least one polymer recovery system. Suitable reactor systems can further comprise systems for feedstock purification, catalyst storage and preparation, extrusion, reactor cooling, polymer recovery, fractionation, recycle, storage, loadout, laboratory analysis, and process control. Depending upon the desired properties of the olefin polymer, hydrogen can be added to the polymerization reactor as needed (e.g., continuously, pulsed, etc.).

Polymerization conditions that can be controlled for efficiency and to provide desired polymer properties can include temperature, pressure, and the concentrations of various reactants. Polymerization temperature can affect catalyst productivity, polymer molecular weight, and molecular weight distribution. Various polymerization conditions can be held substantially constant, for example, for the production of a particular grade of the olefin polymer (or ethylene polymer). A suitable polymerization temperature can be any temperature below the de-polymerization temperature according to the Gibbs Free energy equation. Typically, this includes from about 60° C. to about 280° C., for example, or from about 60° C. to about 120° C., depending upon the type of polymerization reactor(s). In some reactor systems, the polymerization temperature generally can be within a range from about 70° C. to about 100° C., or from about 75° C. to about 95° C.

Suitable pressures will also vary according to the reactor and polymerization type. The pressure for liquid phase polymerizations in a loop reactor is typically less than 1000 psig (6.9 MPa). Pressure for gas phase polymerization is usually at about 200 to 500 psig (1.4 MPa to 3.4 MPa). High pressure polymerization in tubular or autoclave reactors is generally run at about 20,000 to 75,000 psig (138 to 517 MPa). Polymerization reactors can also be operated in a supercritical region occurring at generally higher temperatures and pressures. Operation above the critical point of a pressure/temperature diagram (supercritical phase) can offer advantages to the polymerization reaction process.

Olefin monomers that can be employed with catalyst compositions and polymerization processes of this invention typically can include olefin compounds having from 2 to 30 carbon atoms per molecule and having at least one olefinic double bond, such as ethylene or propylene. In an aspect, the olefin monomer can comprise a $C_2$-$C_{20}$ olefin; alternatively, a $C_2$-$C_{20}$ alpha-olefin; alternatively, a $C_2$-$C_{10}$ olefin; alternatively, a $C_2$-$C_{10}$ alpha-olefin; alternatively, the olefin monomer can comprise ethylene; or alternatively, the olefin monomer can comprise propylene (e.g., to produce a polypropylene homopolymer or a propylene-based copolymer).

When a copolymer (or alternatively, a terpolymer) is desired, the olefin monomer and the olefin comonomer independently can comprise, for example, a $C_2$-$C_{20}$ alpha-olefin. In some aspects, the olefin monomer can comprise ethylene or propylene, which is copolymerized with at least one comonomer (e.g., a $C_2$-$C_{20}$ alpha-olefin, a $C_3$-$C_{20}$ alpha-olefin, etc.). According to one aspect of this invention, the olefin monomer used in the polymerization process can comprise ethylene. In this aspect, the comonomer can comprise a $C_3$-$C_{10}$ alpha-olefin; alternatively, the comonomer can comprise 1-butene, 1-pentene, 1-hexene, 1-octene, 1-decene, styrene, or any combination thereof; alternatively, the comonomer can comprise 1-butene, 1-hexene, 1-octene, or any combination thereof; alternatively, the comonomer can comprise 1-butene; alternatively, the comonomer can comprise 1-hexene; or alternatively, the comonomer can comprise 1-octene.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Melt index (MI, g/10 min) was determined in accordance with ASTM D1238 at 190° C. with a 2,160 gram weight, and high load melt index (HLMI, g/10 min) was determined in accordance with ASTM D1238 at 190° C. with a 21,600 gram weight. Density was determined in grams per cubic centimeter (g/cm$^3$) on a compression molded sample, cooled at 15° C. per hour, and conditioned for 40 hours at room temperature in accordance with ASTM D1505 and ASTM D4703.

Molecular weights and molecular weight distributions were obtained using a PL-GPC 220 (Polymer Labs, an Agilent Company) system equipped with a IR4 detector (Polymer Char, Spain) and three Styragel HMW-6E GPC columns (Waters, MA) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 1.0-1.5 mg/mL, depending on the molecular weight. Sample preparation was conducted at 150° C. for nominally 4 hr with occasional and gentle agitation, before the solutions were transferred to sample vials for injection. An injection volume of about 200 μL was used. The integral calibration method was used to deduce molecular weights and molecular weight distributions using a Chevron Phillips Chemical Company's HDPE polyethylene resin, MARLEX® BHB5003, as the standard. The integral table of the standard was predetermined in a separate experiment with SEC-MALS. Mn is the number-average molecular weight, Mw is the weight-average molecular weight, Mz is the z-average molecular weight, and Mp is the peak molecular weight (location, in molecular weight, of the highest point of the molecular weight distribution curve). The IB parameter was determined from the molecular weight distribution curve (plot of dW/d(Log M) vs. Log M; normalized to an area equal to 1), and is defined as $1/[dW/d(Log\ M)]_{MAX}$.

Melt rheological characterizations were performed as follows. Small-strain (less than 10%) oscillatory shear measurements were performed on an Anton Paar MCR rheometer using parallel-plate geometry. All rheological tests were performed at 190° C. The complex viscosity |η*| versus frequency (ω) data were then curve fitted using the modified three parameter Carreau-Yasuda (CY) empirical model to obtain the zero shear viscosity—$\eta_0$, characteristic viscous relaxation time—$\tau_\eta$, and the breadth parameter—α (CY-a parameter). The simplified Carreau-Yasuda (CY) empirical model is as follows.

$$|\eta^*(\omega)| = \frac{\eta_0}{[1 + (\tau_\eta \omega)^a]^{(1-n)/a}},$$

wherein:
|η*(ω)|=magnitude of complex shear viscosity;
$\eta_0$=zero shear viscosity;
$\tau_\eta$=viscous relaxation time (Tau(η));
α="breadth" parameter (CY-a parameter);
n=fixes the final power law slope, fixed at 2/11; and
ω=angular frequency of oscillatory shearing deformation.

Details of the significance and interpretation of the CY model and derived parameters can be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics*, 2nd Edition, John Wiley & Sons (1987); each of which is incorporated herein by reference in its entirety.

The ATREF procedure was as follows. Forty mg of the polymer sample and 20 mL of 1,2,4-trichlorobenzene (TCB) were sequentially charged into a vessel on a PolyChar TREF 200+instrument. After dissolving the polymer, an aliquot (500 microliters) of the polymer solution was loaded on the column (stainless steel shots) at 150° C. and cooled at 0.5° C./min to 25° C. Then, the elution was begun with a 0.5 mL/min TCB flow rate and heating at 1° C./min up to 120° C., and analyzing with an IR detector. The peak ATREF temperature is the location, in temperature, of the highest point of the ATREF curve.

The long chain branches (LCB's) per 1000 total carbon atoms can be calculated using the method of Janzen and Colby (*J. Mol. Struct.*, 485/486, 569-584 (1999)), from values of zero shear viscosity, $\eta_o$ (determined from the Carreau-Yasuda model, described hereinabove), and measured values of Mw obtained using a Dawn EOS multiangle light scattering detector (Wyatt). See also U.S. Pat. No. 8,114,946; J. Phys. Chem. 1980, 84, 649; and Y. Yu, D. C. Rohlfing, G. R Hawley, and P. J. DesLauriers, *Polymer Preprints*, 44, 49-50 (2003). These references are incorporated herein by reference in their entirety. Although not tested, it is expected that the ethylene polymers of the examples discussed below have low levels of LCB's, such as less than 0.01 long chain branches (LCB's), or less than 0.008 LCB's, per 1000 total carbon atoms.

Short chain branch content and short chain branching distribution (SCBD) across the molecular weight distribution were determined via an IR5-detected GPC system (IR5-GPC), wherein the GPC system was a PL220 GPC/SEC system (Polymer Labs, an Agilent company) equipped with three Styragel HMW-6E columns (Waters, MA) for polymer separation. A thermoelectric-cooled IR5 MCT detector (IR5) (Polymer Char, Spain) was connected to the GPC columns via a hot-transfer line. Chromatographic data was obtained from two output ports of the IR5 detector. First, the analog signal goes from the analog output port to a digitizer before connecting to Computer "A" for molecular weight determinations via the Cirrus software (Polymer Labs, now an Agilent Company) and the integral calibration method using a HDPE Marlex™ BHB5003 resin (Chevron Phillips Chemical) as the molecular weight standard. The digital signals, on the other hand, go via a USB cable directly to Computer "B" where they are collected by a LabView data collection software provided by Polymer Char. Chromatographic conditions were set as follows: column oven temperature of 145° C.; flowrate of 1 mL/min; injection volume of 0.4 mL; and polymer concentration of about 2 mg/mL, depending on sample molecular weight. The temperatures for both the hot-transfer line and IR5 detector sample cell were set at 150° C., while the temperature of the electronics of the IR5 detector was set at 60° C. Short chain branching content was determined via an in-house method using the intensity ratio of $CH_3$ ($I_{CH3}$) to $CH_2$ ($I_{CH2}$) coupled with a calibration curve. The calibration curve was a plot of SCB content ($x_{SCB}$) as a function of the intensity ratio of $I_{CH3}/I_{CH2}$. To obtain a calibration curve, a group of polyethylene resins (no less than 5) of SCB level ranging from zero to ca. 32 SCB/1,000 total carbons (SCB Standards) were used. All these SCB Standards have known SCB levels and flat SCBD profiles predetermined separately by NMR and the solvent-gradient fractionation coupled with NMR (SGF-NMR) methods. Using SCB calibration curves thus established, profiles of short chain branching distribution across the molecular weight distribution were obtained for resins fractionated by the IR5-GPC system under exactly the same chromatographic conditions as for these SCB standards. A relationship between the intensity ratio and the elution volume was converted into SCB distribution as a function of MWD using a predetermined SCB calibration curve (i.e., intensity ratio of $I_{CH3}/I_{CH2}$ vs. SCB content) and MW calibration curve (i.e., molecular weight vs. elution time) to convert the intensity ratio of $I_{CH3}/I_{CH2}$ and the elution time into SCB content and the molecular weight, respectively.

Fluorided silica-coated alumina activator-supports (FSCA) were prepared as follows. Bohemite was obtained from W.R. Grace & Company under the designation "Alumina A" and having a surface area of 300 m²/g, a pore volume of 1.3 mL/g, and an average particle size of 100 microns. The alumina was first calcined in dry air at about 600° C. for approximately 6 hours, cooled to ambient temperature, and then contacted with tetraethylorthosilicate in isopropanol to equal 25 wt. % $SiO_2$. After drying, the silica-coated alumina was calcined at 600° C. for 3 hours. Fluorided silica-coated alumina (7 wt. % F) was prepared by impregnating the calcined silica-coated alumina with an ammonium bifluoride solution in methanol, drying, and then calcining for 3 hours at 600° C. in dry air. Afterward, the fluorided silica-coated alumina (FSCA) was collected and stored under dry nitrogen, and was used without exposure to the atmosphere.

Sulfated alumina activator-supports (S-A) were prepared as follows. Alumina A was impregnated to incipient wetness with an aqueous solution of ammonium sulfate to equal about 15% sulfate. This mixture was then placed in a flat pan and allowed to dry under vacuum at approximately 110° C. for about 16 hours. To calcine the resultant powdered mixture, the material was fluidized in a stream of dry air at about 550° C. for about 6 hours. Afterward, the sulfated alumina (S-A) was collected and stored under dry nitrogen, and was used without exposure to the atmosphere.

Examples 1-47

Comparative Example 47 was a commercially-available LLDPE (ethylene copolymer) resin from Chevron-Phillips Chemical Company LP, while Examples 1-46 were produced as follows. The polymerization experiments of Examples 1-46 were conducted for 30 min in a one gallon stainless-steel autoclave reactor containing two liters of isobutane as diluent, and hydrogen added from a 325 cc auxiliary vessel. Generally, a triisobutylaluminum solution (TMA, 25% in heptanes) (and 0.5 mL of a 1 M DEZ solution for Examples 2-14), a chemically-treated solid oxide (S-A, except for Examples 44-45, which used FSCA), a solution containing 1 mg/mL of the titanium half-metallocene compound (typically 0.5-1 mg), a solution containing 1 mg/mL mg of the metallocene compound (typically 1-2 mg), and 30-60 grams of 1-hexene were used for Examples 1-46. Ethylene and hydrogen were fed on demand to maintain the reactor pressure of 320 psig. The reactor was maintained at the desired run temperature throughout the experiment by an automated heating-cooling system. After venting of the reactor, purging, and cooling, the resulting polymer product was dried at 60° C. under reduced pressure.

The structures for the titanium half-metallocene and the metallocene compounds used in Examples 1-46 are shown below (Ph=phenyl; t-Bu=tert-butyl):

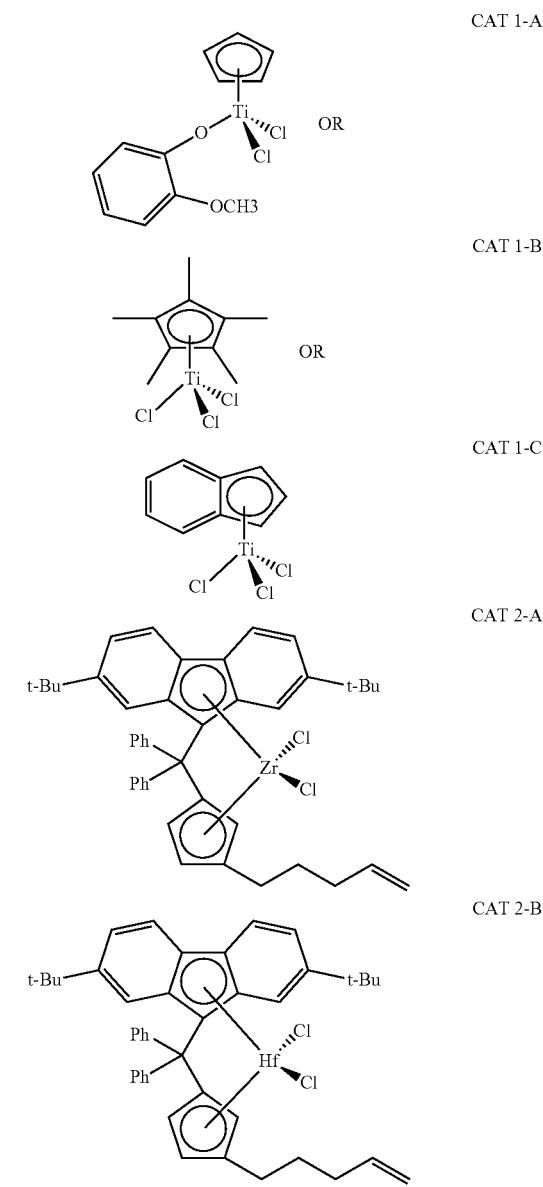

Examples 1-14 were produced with catalysts 1-C and 2-A, Examples 15-17 were produced with catalysts 1-B and 2-B, Examples 18-31 were produced with catalysts 1-A and 2-A, Examples 32-43 were produced with catalysts 1-B and 2-A, and Examples 44-46 were produced with catalysts 1-A or 1-C and 2-A.

Specific procedures for certain examples follow, and are representative of the polymerization reaction conditions used for the other examples. For Example 1, 0.5 mL of the TIBA solution, 0.2 grams of S-A, and 1 mL of catalyst 1-C and 1 mL of catalyst 2-A solutions in toluene were added into a reactor, respectively, at 25° C. The reactor was sealed and 2 L of isobutane were added and stirring started at 700 rpm. As the reactor temperature approached 70° C., 1-hexene (60 grams) and ethylene (320 psig, with 1000 ppm hydrogen) addition was begun, and the set point of 80° C. was rapidly attained. The reactor was held at 80° C. for 30 minutes. Example 1 yielded 239 grams of ethylene polymer.

For Example 5, 0.5 mL of the TIBA solution, 0.5 mL of the DEZ solution, 0.2 grams of S-A, and 1 mL of catalyst 1-C and 1 mL of catalyst 2-A solutions in toluene were added into a reactor, respectively, at 25° C. The reactor was sealed and 2 L of isobutane were added and stirring started at 700 rpm. As the reactor temperature approached 70° C., 1-hexene (60 grams) and ethylene (320 psig, with 1000 ppm hydrogen) addition was begun, and the set point of 80° C. was rapidly attained. The reactor was held at 80° C. for 30 minutes. Example 5 yielded 183 grams of ethylene polymer.

For Example 10, 0.5 mL of the TIBA solution, 0.5 mL of the DEZ solution, 0.2 grams of S-A, and 1 mL of catalyst 1-C and 1 mL of catalyst 2-A solutions in toluene were added into a reactor, respectively, at 25° C. The reactor was sealed and 2 L of isobutane were added and stirring started at 700 rpm. As the reactor temperature approached 70° C., 1-hexene (60 grams) and ethylene (320 psig, with 800 ppm hydrogen) addition was begun, and the set point of 80° C. was rapidly attained. The reactor was held at 80° C. for 30 minutes. Example 10 yielded 259 grams of ethylene polymer.

For Example 11, 0.5 mL of the TIBA solution, 0.5 mL of the DEZ solution, 0.2 grams of S-A, and 1 mL of catalyst 1-C and 1 mL of catalyst 2-A solutions in toluene were added into a reactor, respectively, at 25° C. The reactor was sealed and 2 L of isobutane were added and stirring started at 700 rpm. As the reactor temperature approached 70° C., 1-hexene (60 grams) and ethylene (320 psig, with 750 ppm hydrogen) addition was begun, and the set point of 80° C. was rapidly attained. The reactor was held at 80° C. for 30 minutes. Example 11 yielded 173 grams of ethylene polymer.

For Example 12, 0.5 mL of the TIBA solution, 0.5 mL of the DEZ solution, 0.2 grams of S-A, and 1 mL of catalyst 1-C and 1 mL of catalyst 2-A solutions in toluene were added into a reactor, respectively, at 25° C. The reactor was sealed and 2 L of isobutane were added and stirring started at 700 rpm. As the reactor temperature approached 70° C., 1-hexene (60 grams) and ethylene (320 psig, with 850 ppm hydrogen) addition was begun, and the set point of 80° C. was rapidly attained. The reactor was held at 80° C. for 30 minutes. Example 12 yielded 246 grams of ethylene polymer.

For Example 15, 0.5 mL of the TIBA solution, 0.2 grams of S-A, and 1 mL of catalyst 1-B and 1 mL of catalyst 2-B solutions in toluene were added into a reactor, respectively, at 25° C. The reactor was sealed and 2 L of isobutane were added and stirring started at 700 rpm. As the reactor temperature approached 70° C., 1-hexene (55 grams) and ethylene (320 psig, with 900 ppm hydrogen) addition was begun, and the set point of 80° C. was rapidly attained. The reactor was held at 80° C. for 30 minutes. Example 15 yielded 136 grams of ethylene polymer.

For Example 16, 0.5 mL of the TIBA solution, 0.2 grams of S-A, and 1 mL of catalyst 1-B and 1 mL of catalyst 2-B solutions in toluene were added into a reactor, respectively, at 25° C. The reactor was sealed and 2 L of isobutane were added and stirring started at 700 rpm. As the reactor temperature approached 70° C., 1-hexene (55 grams) and ethylene (320 psig, with 700 ppm hydrogen) addition was begun, and the set point of 80° C. was rapidly attained. The reactor was held at 80° C. for 30 minutes. Example 16 yielded 130 grams of ethylene polymer.

For Example 17, 0.5 mL of the TIBA solution, 0.2 grams of S-A, and 1 mL of catalyst 1-B and 1 mL of catalyst 2-B solutions in toluene were added into a reactor, respectively, at 25° C. The reactor was sealed and 2 L of isobutane were added and stirring started at 700 rpm. As the reactor temperature approached 70° C., 1-hexene (55 grams) and ethylene (320 psig, with 800 ppm hydrogen) addition was begun, and the set point of 80° C. was rapidly attained. The reactor was held at 80° C. for 30 minutes. Example 17 yielded 159 grams of ethylene polymer.

For Example 34, 0.5 mL of the TIBA solution, 0.2 grams of S-A, and 1 mL of catalyst 1-B and 1 mL of catalyst 2-A solutions in toluene were added into a reactor, respectively, at 25° C. The reactor was sealed and 2 L of isobutane were added and stirring started at 700 rpm. As the reactor temperature approached 70° C., 1-hexene (55 grams) and ethylene (320 psig, with 800 ppm hydrogen) addition was begun, and the set point of 80° C. was rapidly attained. The reactor was held at 80° C. for 30 minutes. Example 34 yielded 260 grams of ethylene polymer.

For Example 35, 0.5 mL of the TIBA solution, 0.2 grams of S-A, and 1 mL of catalyst 1-B and 1 mL of catalyst 2-A solutions in toluene were added into a reactor, respectively, at 25° C. The reactor was sealed and 2 L of isobutane were added and stirring started at 700 rpm. As the reactor temperature approached 70° C., 1-hexene (55 grams) and ethylene (320 psig, with 600 ppm hydrogen) addition was begun, and the set point of 80° C. was rapidly attained. The reactor was held at 80° C. for 30 minutes. Example 35 yielded 232 grams of ethylene polymer.

For Example 36, 0.5 mL of the TIBA solution, 0.2 grams of S-A, and 1 mL of catalyst 1-B and 1 mL of catalyst 2-A solutions in toluene were added into a reactor, respectively, at 25° C. The reactor was sealed and 2 L of isobutane were added and stirring started at 700 rpm. As the reactor temperature approached 70° C., 1-hexene (55 grams) and ethylene (320 psig, with 500 ppm hydrogen) addition was begun, and the set point of 80° C. was rapidly attained. The reactor was held at 80° C. for 30 minutes. Example 36 yielded 172 grams of ethylene polymer.

For Example 44, 0.5 mL of the TIBA solution, 0.2 grams of FSCA, and 1 mL of catalyst 1-C and 0.5 mL of catalyst 2-A solutions in toluene were added into a reactor, respectively, at 25° C. The reactor was sealed and 2 L of isobutane were added and stirring started at 700 rpm. As the reactor temperature approached 70° C., 1-hexene (60 grams) and ethylene (320 psig, with 1200 ppm hydrogen) addition was begun, and the set point of 80° C. was rapidly attained. The reactor was held at 80° C. for 30 minutes. Example 44 yielded 258 grams of ethylene polymer.

For Example 45, 0.5 mL of the TIBA solution, 0.2 grams of FSCA, and 0.5 mL of catalyst 1-C and 1 mL of catalyst 2-A solutions in toluene were added into a reactor, respectively, at 25° C. The reactor was sealed and 2 L of isobutane were added and stirring started at 700 rpm. As the reactor temperature approached 70° C., 1-hexene (60 grams) and ethylene (320 psig, with 1000 ppm hydrogen) addition was begun, and the set point of 80° C. was rapidly attained. The reactor was held at 80° C. for 30 minutes. Example 45 yielded 226 grams of ethylene polymer.

For Example 46, 0.5 mL of the TIBA solution, 0.2 grams of S-A, and 1 mL of catalyst 1-A and 1 mL of catalyst 2-A solutions in toluene were added into a reactor, respectively, at 25° C. The reactor was sealed and 2 L of isobutane were added and stirring started at 700 rpm. As the reactor temperature approached 70° C., 1-hexene (60 grams) and ethylene (320 psig, with 1000 ppm hydrogen) addition was begun, and the set point of 80° C. was rapidly attained. The reactor was held at 80° C. for 30 minutes. Example 46 yielded 238 grams of ethylene polymer.

Figure 2:
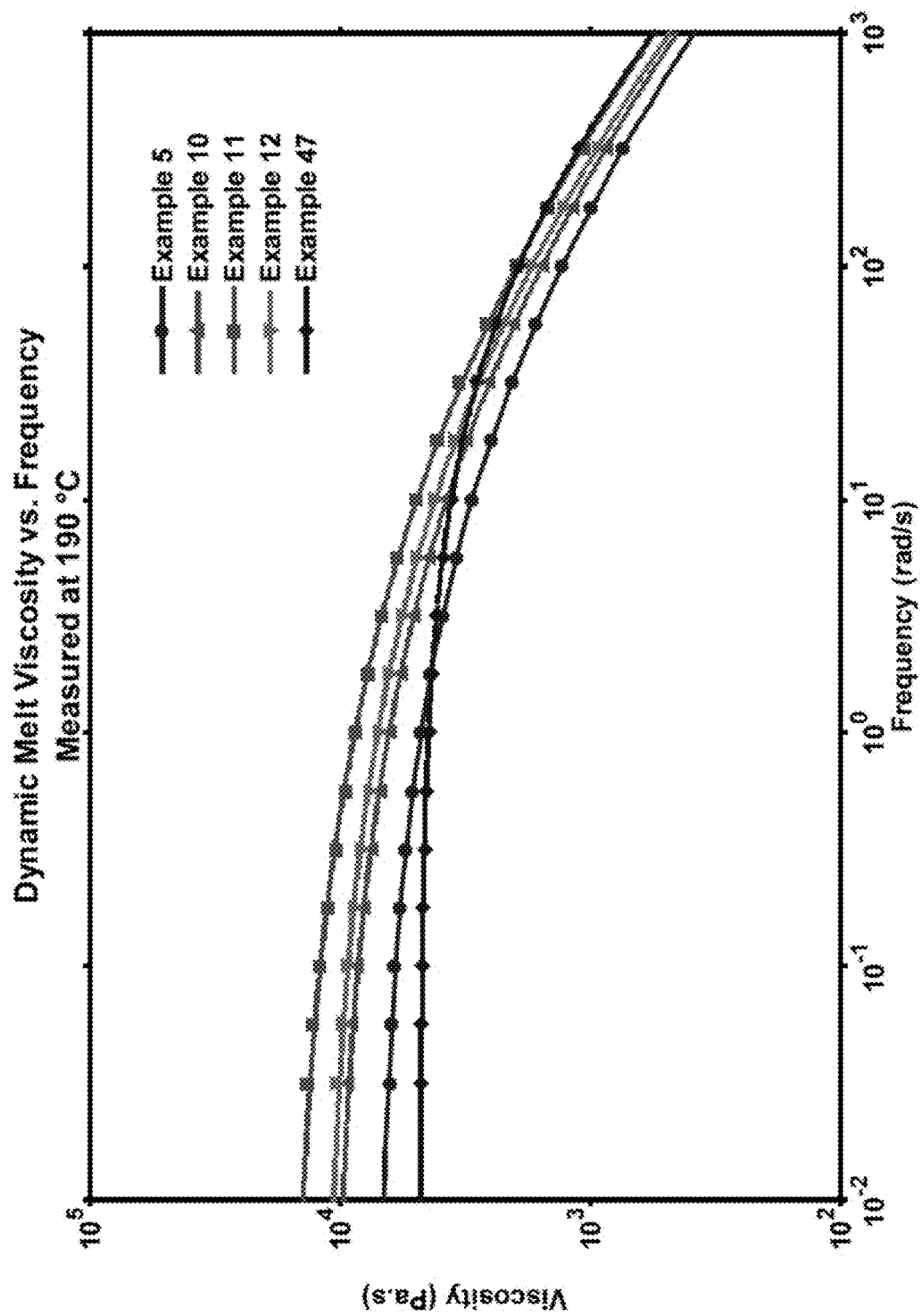
FIG. 2 presents a dynamic rheology plot (viscosity versus shear rate) at 190° C. for the polymers of Examples 5, 10-12, and 47.
Figure 5:
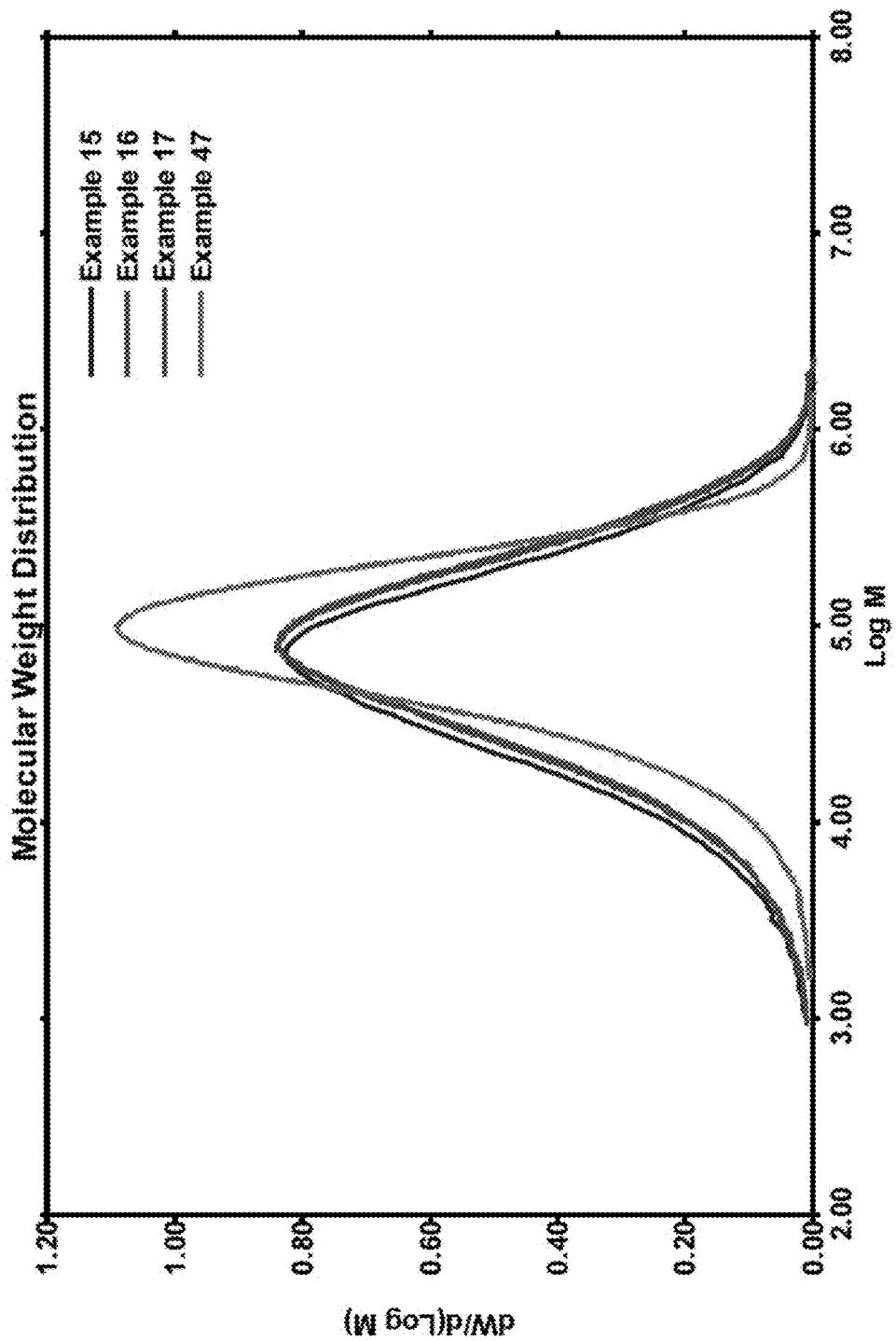
FIG. 5 presents a plot of the molecular weight distributions of the polymers of Examples 15-17 and 47.
Figure 6:
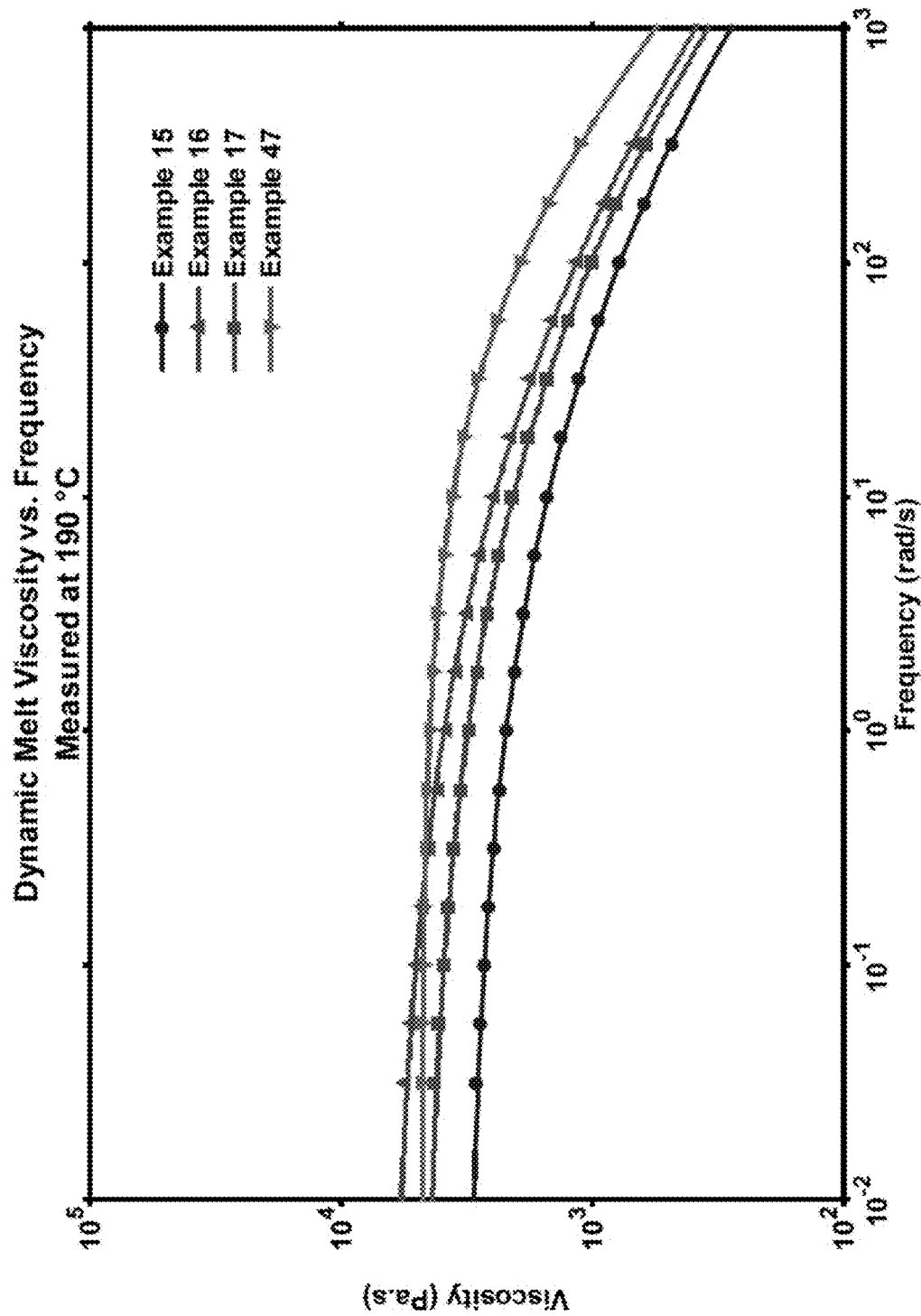
FIG. 6 presents a dynamic rheology plot (viscosity versus shear rate) at 190° C. for the polymers of Examples 15-17 and 47.
Figure 7:
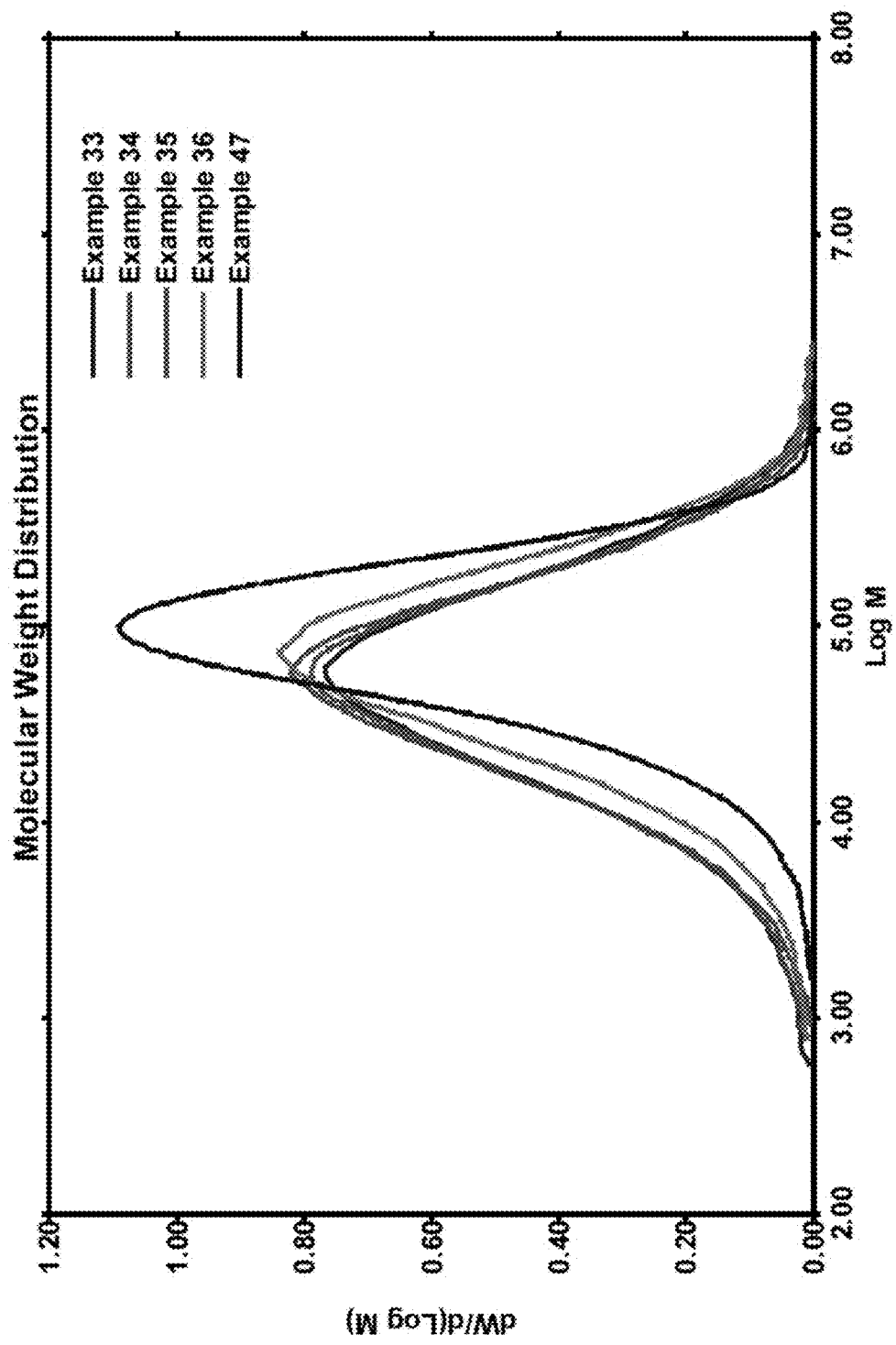
FIG. 7 presents a plot of the molecular weight distributions of the polymers of Examples 33-36 and 47.
Figure 8:
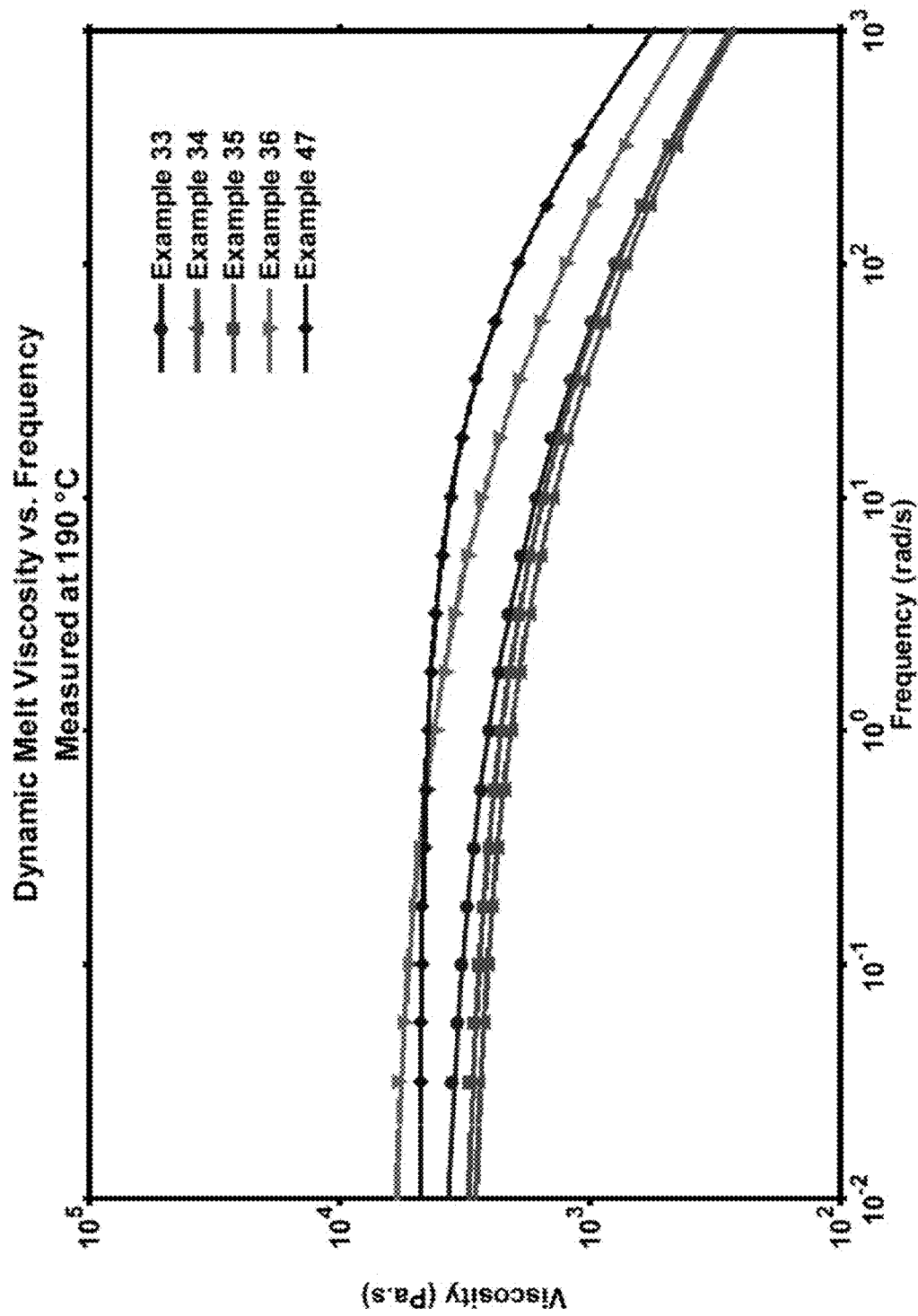
FIG. 8 presents a dynamic rheology plot (viscosity versus shear rate) at 190° C. for the polymers of Examples 33-36 and 47.

Table I summarizes certain properties of the polymers of Examples 1-14, Table II summarizes certain properties of the polymers of Examples 15-17, Table III summarizes certain properties of the polymers of Examples 18-31, Table IV summarizes certain properties of the polymers of Examples 32-43, and Table V summarizes certain properties of the polymers of Examples 44-46 and Comparative Example 47. Representative molecular weight distribution curves (amount of polymer versus the logarithm of molecular weight) for the some of the polymers shown in Tables I-V are presented in FIG. 1, FIG. 5, and FIG. 7. FIG. 1 illustrates the molecular weight distributions for the polymers of Examples 1, 5, 10-12, and 47, FIG. 5 illustrates the molecular weight distributions of the polymers of Examples 15-17 and 47, and FIG. 7 illustrates the molecular weight distributions of the polymers of Examples 33-36 and 47. Representative rheology curves (viscosity versus shear rate at 190° C.) for the some of the polymers shown in Tables I-V are presented in FIG. 2, FIG. 6, and FIG. 8. FIG. 2 illustrates the dynamic rheology plot for the polymers of Examples 5, 10-12, and 47, FIG. 6 illustrates the dynamic rheology plot for the polymers of Examples 15-17 and 47, and FIG. 8 illustrates the dynamic rheology plot for the polymers of Examples 33-36 and 47.

From these tables and figures, it is apparent that the polymers of Examples 1-46 are broader in molecular weight distribution than Example 47: the polymers of Examples 1-46 have higher ratios of Mw/Mn, higher ratios of Mz/Mw, and higher D3 values than that of the polymer of Example 47. Additionally, the polymers of Examples 1-46 have a higher Mz and a lower Mn than that of the polymer of Example 47. In the figures, note the tails on both the low molecular weight and high molecular weight ends of the molecular weight distribution curves for the inventive polymers as compared to the polymer of Example 47. Also from these tables and figures, the polymers of Examples 1-46 are more shear thinning than the polymer of Example 47; the CY-a parameters for the polymers of Examples 1-46 are much lower than that of the polymer of Example 47. In sum, the polymers of Examples 1-46 demonstrate unexpected and beneficial improvements in processability and melt strength as compared to the polymer of Example 47.

Cast film samples at a 1-mil thickness (25 microns) were produced from Examples 44-47 on a laboratory-scale cast film line using typical linear low density polyethylene conditions (LLDPE) as follows: 127 mm die width, 0.508 mm die gap, 16 mm diameter single-screw extruder (L/D=24-27), 0.5 kg/hr output rate, and 204° C. barrel and die set temperatures. Cooling was accomplished with chill roll at about 23° C. These particular processing conditions were chosen because the cast film properties so obtained are typically representative of those obtained from larger, commercial scale film casting conditions.

Machine direction (MD) and transverse direction (TD) Elmendorf tear strengths (g/mil) of the cast films were measured on a Testing Machines tear tester (Model 83-11-00) in accordance with ASTM D1922. Table V summarizes the MD and TD Elmendorf tear strengths of cast film samples of Examples 44-46 (and representative of the other ethylene polymer compositions of this invention) and comparative Example 47 (a metallocene-based LLDPE). As shown in Table V, in addition to the beneficial processability and melt strength of the polymers of Examples 44-46 as compared to the polymer of Example 47, the tear resistance of the films made from the respective polymers were comparable.

Figure 3:
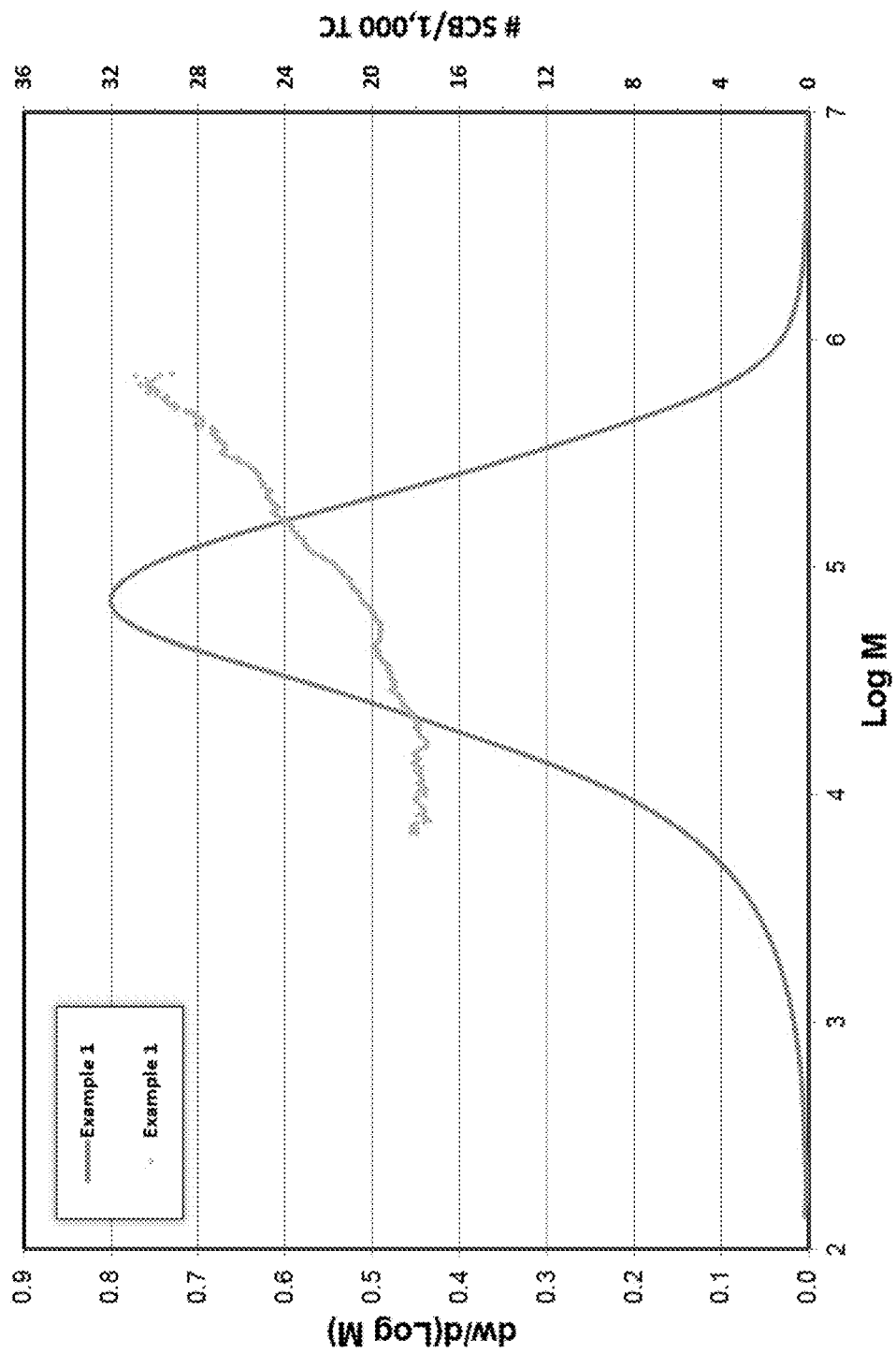
FIG. 3 presents a plot of the molecular weight distribution and short chain branch distribution of the polymer of Example 1.

The reverse comonomer distribution of the polymers of Examples 1-46 is shown by FIG. 3, which illustrates the molecular weight distribution and short chain branch distribution of the polymer of representative Example 1. In FIG. 3, there are relatively more short chain branches (SCB's) at the higher molecular weights; the number of SCB's per 1000 total carbon (TC) atoms of the polymer at Mz (or Mw) is greater than at Mn.

Figure 4:
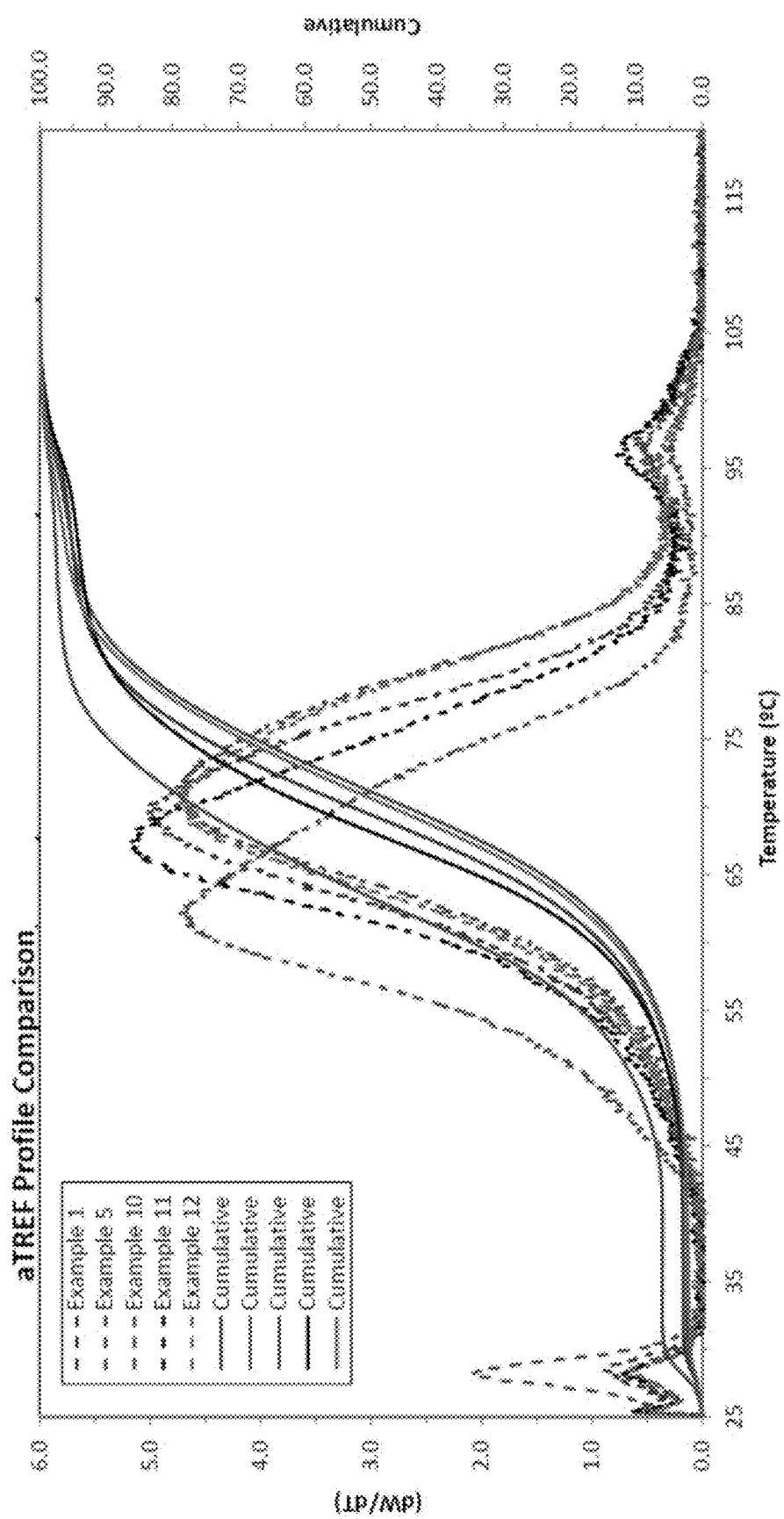
FIG. 4 presents a plot of the ATREF profiles of the polymers of Examples 1, 5, and 10-12.
Figure 9:
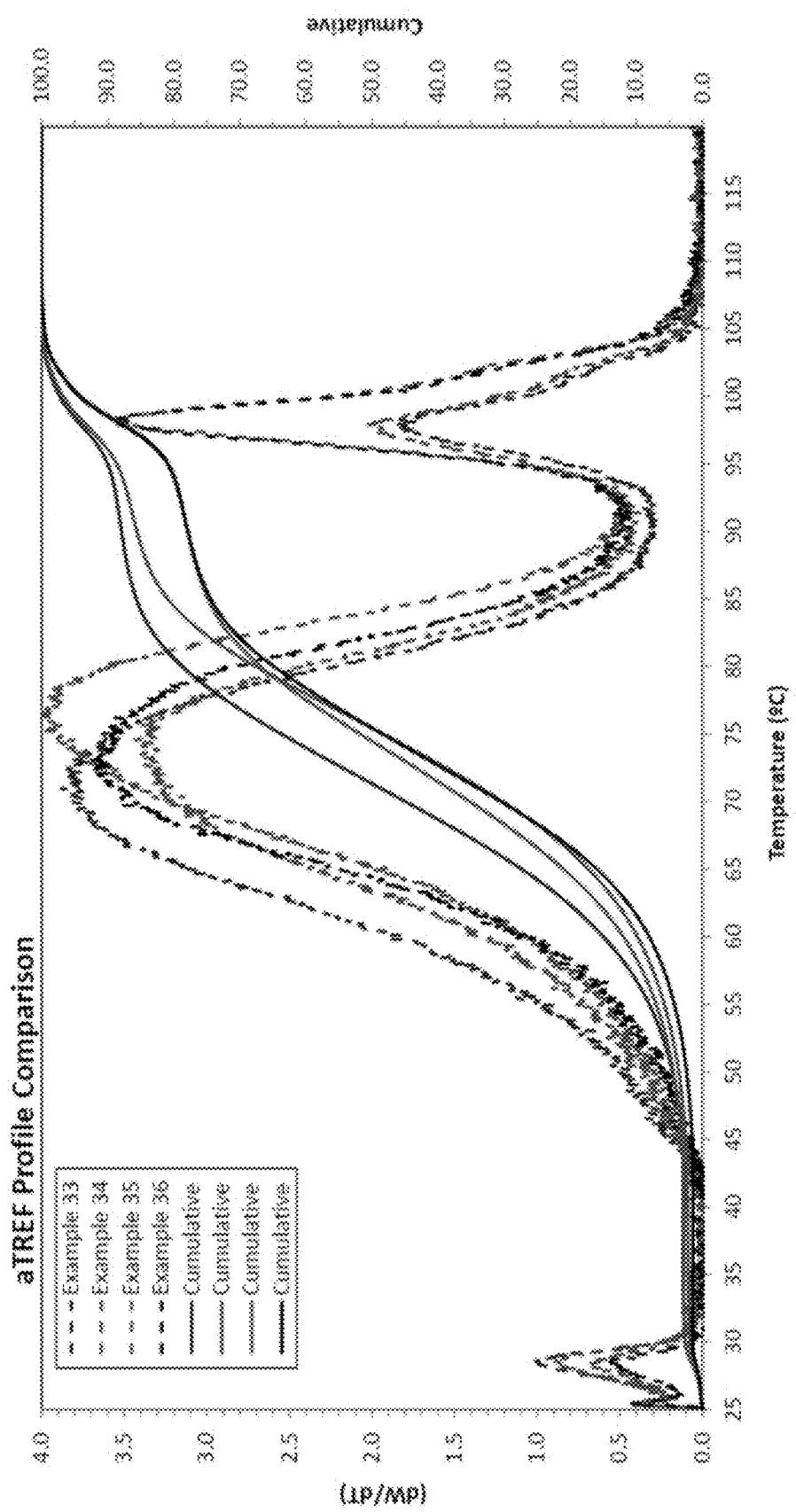
FIG. 9 presents a plot of the ATREF profiles of the polymers of Examples 33-36.
Figure 10:
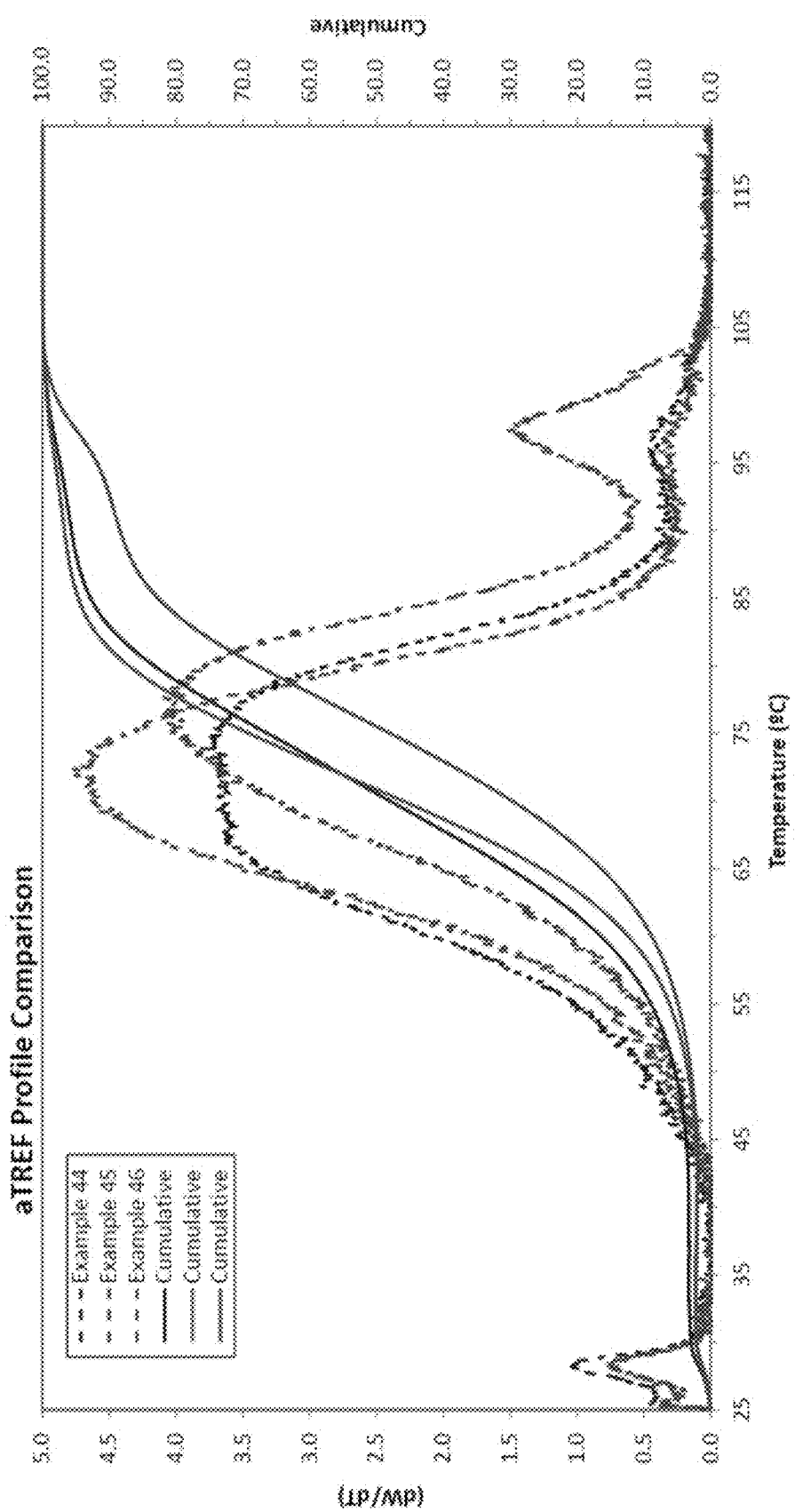
FIG. 10 presents a plot of the ATREF profiles of the polymers of Examples 44-46.
Figure 11:
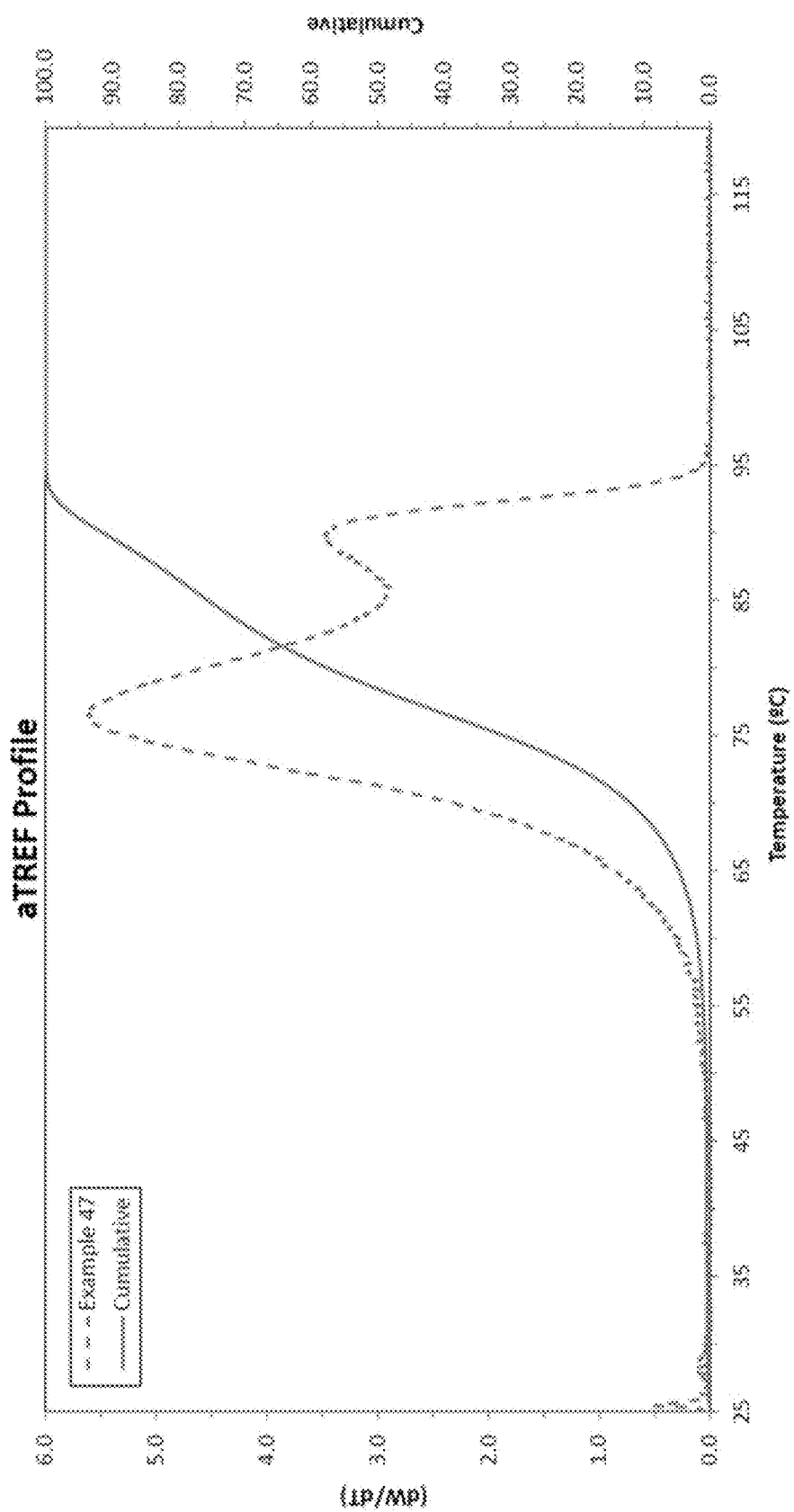
FIG. 11 presents a plot of the ATREF profile of the polymer of Example 47.

Representative ATREF curves for the some of the polymers shown in Tables I-V are presented in the following figures: FIG. 4 illustrates the ATREF profiles for the polymers of Examples 1, 5, and 10-12, FIG. 9 illustrates the ATREF profiles for the polymers of Examples 33-36, FIG. 10 illustrates the ATREF profiles of the polymers of Examples 44-46, and FIG. 11 illustrates the ATREF profile for the polymer of Example 47. Certain information from these ATREF profiles is summarized in Table VI.

The ATREF profiles of FIG. 4, FIG. 9, and FIG. 10 are representative of the ethylene polymers of this invention, and these ATREF curves generally contain two peaks in the 55-105° C. range, with the first peak (lower temperature peak) at a temperature in the 62-78° C. range, and with the second peak (higher temperature peak) at a temperature in the 95-98° C. range. The difference between the temperatures of the first peak and the second peak (ΔT) was between 20 and 34° C. Further, the amount of the polymer eluted below a temperature of 40° C. was from 2 to 6 wt. %, the amount of the polymer eluted between 40 and 76° C. was from 50 to 86 wt. %, the amount of the polymer eluted between 76 and 86° C. was from 5 to 33 wt. %, and the amount of the polymer eluted above a temperature of 86° C. was from 3 to 24 wt. %. These ATREF characteristics were surprisingly different from that of the polymer of Example 47, in which the higher temperature peak was below 90° C. and the ΔT was less than 15° C., and less than 40 wt. % of the polymer was eluted between 40 and 76° C., and greater than 40 wt. % of the polymer was eluted between 76 and 86° C.

TABLE I

| Examples 1-14 | | | | | | | |
|---|---|---|---|---|---|---|---|
| Example | Density (g/cc) | MI (g/10 min) | HLMI (g/10 min) | HLMI/MI | Mn/1000 (g/mol) | Mw/1000 (g/mol) | Mz/1000 (g/mol) |
| 1 | 0.914 | 1.03 | 42 | 41 | 21.8 | 122 | 319 |
| 2 | 0.912 | 1.46 | 64 | 44 | 11.4 | 113 | 345 |
| 3 | — | 1.08 | 56 | 52 | 20.4 | 117 | 345 |
| 4 | 0.912 | 1.83 | 67 | 36 | 23.9 | 116 | 366 |
| 5 | 0.905 | 1.35 | 46 | 34 | 27.7 | 126 | 363 |
| 6 | 0.911 | 0.55 | 20 | 36 | 21.1 | 143 | 380 |
| 7 | 0.913 | 1.58 | 71 | 45 | 15.3 | 120 | 428 |
| 8 | — | 1.14 | 48 | 42 | 19.5 | 118 | 403 |
| 9 | 0.910 | 1.36 | 49 | 36 | 24.8 | 131 | 404 |
| 10 | 0.912 | 1.11 | 36 | 32 | 27.2 | 133 | 434 |
| 11 | 0.907 | 0.89 | 27 | 30 | 30.4 | 144 | 447 |

TABLE I-continued

Examples 1-14

| | | | | | | | |
|---|---|---|---|---|---|---|---|
| 12 | 0.911 | 1.17 | 37 | 32 | 27.6 | 138 | 428 |
| 13 | 0.911 | 1.71 | 57 | 33 | 24.6 | 126 | 398 |
| 14 | 0.911 | 1.02 | 37 | 36 | 24.2 | 137 | 395 |

| Example | Mv/1000 (g/mol) | Mp/1000 (g/mol) | Mw/Mn | Mz/Mw | IB | $\eta_0$ (Pa-sec) | CY-a |
|---|---|---|---|---|---|---|---|
| 1 | 104 | 79 | 5.6 | 2.6 | 1.27 | 11,800 | 0.319 |
| 2 | 93 | 74 | 9.8 | 3.1 | — | 8,400 | 0.319 |
| 3 | 98 | 72 | 5.7 | 3.0 | — | 9,500 | 0.341 |
| 4 | 98 | 74 | 4.9 | 3.1 | — | 8,200 | 0.311 |
| 5 | 106 | 74 | 4.5 | 2.9 | 1.24 | 7,300 | 0.373 |
| 6 | 122 | 90 | 6.8 | 2.9 | — | 20,800 | 0.318 |
| 7 | 99 | 71 | 7.9 | 3.5 | — | 7,600 | 0.333 |
| 8 | 98 | 77 | 6.1 | 3.4 | — | 8,300 | 0.376 |
| 9 | 109 | 83 | 5.3 | 3.1 | — | 7,300 | 0.403 |
| 10 | 112 | 96 | 4.9 | 3.3 | 1.28 | 11,000 | 0.349 |
| 11 | 122 | 90 | 4.7 | 3.1 | 1.22 | 16,300 | 0.340 |
| 12 | 117 | 85 | 5.0 | 3.1 | 1.28 | 11,800 | 0.366 |
| 13 | 106 | 75 | 5.1 | 3.1 | — | 5,900 | 0.407 |
| 14 | 115 | 93 | 5.7 | 2.9 | — | 9,600 | 0.411 |

TABLE II

Examples 15-17

| Example | Density (g/cc) | MI (g/10 min) | HLMI (g/10 min) | HLMI/MI | Mn/1000 (g/mol) | Mw/1000 (g/mol) | Mz/1000 (g/mol) |
|---|---|---|---|---|---|---|---|
| 15 | 0.922 | 3.15 | 108 | 34 | 26.0 | 105 | 278 |
| 16 | 0.921 | 1.80 | 61 | 34 | 30.1 | 121 | 320 |
| 17 | 0.921 | 2.29 | 72 | 32 | 28.5 | 117 | 311 |

| Example | Mv/1000 (g/mol) | Mp/1000 (g/mol) | Mw/Mn | Mz/Mw | IB | $\eta_0$ (Pa-sec) | CY-a |
|---|---|---|---|---|---|---|---|
| 15 | 90 | 74 | 4.0 | 2.7 | — | 3,300 | 0.336 |
| 16 | 104 | 78 | 4.0 | 2.6 | — | 6,600 | 0.316 |
| 17 | 100 | 78 | 4.1 | 2.7 | — | 4,800 | 0.339 |

TABLE III

Examples 18-31

| Example | Density (g/cc) | MI (g/10 min) | HLMI (g/10 min) | HLMI/MI | Mn/1000 (g/mol) | Mw/1000 (g/mol) | Mz/1000 (g/mol) |
|---|---|---|---|---|---|---|---|
| 18 | 0.914 | 0.98 | 35 | 36 | 33.6 | 149 | 401 |
| 19 | 0.918 | 1.15 | 51 | 44 | 25.3 | 142 | 413 |
| 20 | 0.917 | 1.04 | 36 | 35 | 34.8 | 150 | 403 |
| 21 | 0.924 | 2.64 | 123 | 47 | 19.3 | 121 | 399 |
| 22 | 0.916 | 1.18 | 46 | 39 | 21.8 | 126 | 366 |
| 23 | 0.915 | 0.65 | 28 | 43 | 29.9 | 148 | 405 |
| 24 | 0.915 | 0.67 | 27 | 41 | 35.2 | 151 | 388 |
| 25 | 0.916 | 0.95 | 32 | 34 | 32.6 | 147 | 373 |
| 26 | 0.917 | 1.12 | 39 | 35 | 30.5 | 139 | 385 |
| 27 | 0.913 | 0.77 | 24 | 31 | 38.9 | 162 | 408 |
| 28 | 0.916 | 0.80 | 25 | 31 | 38.6 | 155 | 385 |
| 29 | 0.917 | 1.11 | 38 | 34 | 33.0 | 146 | 421 |
| 30 | 0.914 | 0.95 | 32 | 34 | 28.4 | 123 | 336 |
| 31 | 0.922 | 4.46 | 161 | 36 | 18.0 | 89 | 262 |

| Example | Mv/1000 (g/mol) | Mp/1000 (g/mol) | Mw/Mn | Mz/Mw | IB | $\eta_0$ (Pa-sec) | CY-a |
|---|---|---|---|---|---|---|---|
| 18 | 128 | 94 | 4.5 | 2.7 | — | 10,900 | 0.358 |
| 19 | 119 | 88 | 5.6 | 2.9 | — | 9,500 | 0.348 |
| 20 | 128 | 93 | 4.3 | 2.7 | — | 8,700 | 0.316 |
| 21 | 99 | 66 | 6.3 | 3.3 | — | 4,200 | 0.323 |

TABLE III-continued

| Examples 18-31 | | | | | | | |
|---|---|---|---|---|---|---|---|
| 22 | 105 | 79 | 5.8 | 2.9 | — | 8,600 | 0.368 |
| 23 | 126 | 103 | 4.9 | 2.7 | — | 11,000 | 0.383 |
| 24 | 130 | 104 | 4.3 | 2.6 | — | 14,200 | 0.357 |
| 25 | 126 | 100 | 4.5 | 2.5 | — | 10,600 | 0.366 |
| 26 | 118 | 90 | 4.5 | 2.8 | — | 9,200 | 0.361 |
| 27 | 140 | 113 | 4.2 | 2.5 | — | 14,300 | 0.385 |
| 28 | 134 | 103 | 4.0 | 2.5 | — | 13,100 | 0.370 |
| 29 | 124 | 92 | 4.4 | 2.9 | — | 9,500 | 0.339 |
| 30 | 105 | 84 | 4.3 | 2.7 | — | — | — |
| 31 | 75 | 54 | 4.9 | 2.9 | — | — | — |

TABLE IV

| Examples 32-43 | | | | | | | |
|---|---|---|---|---|---|---|---|
| Example | Density (g/cc) | MI (g/10 min) | HLMI (g/10 min) | HLMI/MI | Mn/1000 (g/mol) | Mw/1000 (g/mol) | Mz/1000 (g/mol) |
| 32 | 0.920 | 5.8 | 175 | 30 | 19.2 | 89 | 266 |
| 33 | 0.916 | 3.1 | 103 | 33 | 18.6 | 99 | 346 |
| 34 | 0.920 | 3.6 | 118 | 33 | 20.4 | 95 | 329 |
| 35 | 0.920 | 3.0 | 89 | 30 | 22.7 | 87 | 217 |
| 36 | 0.918 | 1.7 | 51 | 30 | 26.3 | 112 | 337 |
| 37 | 0.914 | 2.5 | 76 | 31 | 19.8 | 96 | 269 |
| 38 | 0.917 | 3.3 | 104 | 32 | 17.5 | 90 | 259 |
| 39 | 0.918 | 2.0 | 63 | 31 | 23.1 | 101 | 276 |
| 40 | 0.914 | 1.8 | 61 | 33 | 22.7 | 103 | 292 |
| 41 | 0.912 | 1.9 | 58 | 31 | 21.0 | 104 | 296 |
| 42 | 0.916 | 3.5 | 118 | 33 | 15.2 | 91 | 281 |
| 43 | 0.914 | 2.6 | 82 | 32 | 20.2 | 98 | 273 |

| Example | Mv/1000 (g/mol) | Mp/1000 (g/mol) | Mw/Mn | Mz/Mw | IB | $\eta_0$ (Pa-sec) | CY-a |
|---|---|---|---|---|---|---|---|
| 32 | 75 | 53 | 4.7 | 3.0 | — | 2,900 | 0.342 |
| 33 | 82 | 59 | 5.3 | 3.5 | 1.30 | 4,200 | 0.319 |
| 34 | 79 | 55 | 4.7 | 3.5 | 1.27 | 3,200 | 0.320 |
| 35 | 75 | 58 | 3.8 | 2.5 | 1.22 | 3,300 | 0.340 |
| 36 | 96 | 72 | 4.3 | 3.0 | 1.19 | 6,600 | 0.344 |
| 37 | 82 | 64 | 4.9 | 2.8 | — | 4,800 | 0.321 |
| 38 | 76 | 56 | 5.1 | 2.9 | — | 3,900 | 0.322 |
| 39 | 87 | 63 | 4.4 | 2.7 | — | 6,000 | 0.330 |
| 40 | 88 | 63 | 4.5 | 2.8 | — | 7,900 | 0.282 |
| 41 | 88 | 65 | 4.9 | 2.9 | — | 6,800 | 0.312 |
| 42 | 76 | 56 | 6.0 | 3.1 | — | 3,300 | 0.338 |
| 43 | 83 | 59 | 4.8 | 2.8 | — | 4,600 | 0.343 |

TABLE V

| Examples 44-47 | | | | | | | |
|---|---|---|---|---|---|---|---|
| Example | Density (g/cc) | MI (g/10 min) | HLMI (g/10 min) | HLMI/MI | Mn/1000 (g/mol) | Mw/1000 (g/mol) | Mz/1000 (g/mol) |
| 44 | 0.913 | 0.96 | — | — | 21.6 | 117 | 447 |
| 45 | 0.912 | 1.06 | — | — | 22.1 | 118 | 381 |
| 46 | 0.920 | 2.98 | — | — | 17.0 | 90 | 263 |
| 47 | 0.916 | 1.40 | — | — | 47.3 | 114 | 207 |

| Example | Mw/Mn | Mz/Mw | IB | $\eta_0$ (Pa-sec) | CY-a | MD Tear (g/mil) | TD Tear (g/mil) |
|---|---|---|---|---|---|---|---|
| 44 | 5.4 | 3.8 | 1.27 | 13,500 | 0.281 | 130 | 285 |
| 45 | 5.4 | 3.2 | 1.27 | 12,300 | 0.319 | 139 | 297 |
| 46 | 5.3 | 2.9 | 1.23 | 2,600 | 0.268 | 197 | 553 |
| 47 | 2.4 | 1.8 | 0.89 | 5,900 | 0.576 | 188 | 371 |

TABLE VI

ATREF characterization

| Example | <40° C. (wt. %) | 40-76° C. (wt. %) | 76-86° C. (wt. %) | >86° C. (wt. %) | Lower Temp. Peak (° C.) | Higher Temp. Peak (° C.) |
|---|---|---|---|---|---|---|
| 44 | 3 | 67 | 24 | 6 | 75 | 97 |
| 45 | 2 | 72 | 21 | 5 | 72 | 96 |
| 46 | 2 | 50 | 33 | 15 | 77 | 97 |
| 33 | 3 | 65 | 18 | 14 | 71 | 98 |
| 34 | 3 | 53 | 20 | 24 | 74 | 98 |
| 35 | 2 | 51 | 30 | 17 | 78 | 98 |
| 36 | 2 | 50 | 24 | 24 | 73 | 98 |
| 1 | 3 | 76 | 15 | 6 | 70 | 97 |
| 5 | 6 | 86 | 5 | 3 | 62 | 96 |
| 10 | 2 | 70 | 22 | 6 | 71 | 97 |
| 11 | 2 | 79 | 12 | 7 | 67 | 97 |
| 12 | 2 | 72 | 21 | 5 | 71 | 95 |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. An ethylene polymer having a density in a range from about 0.89 to about 0.93 g/cm$^3$, a ratio of Mw/Mn in a range from about 3 to about 6.5, a Mz in a range from about 200,000 to about 650,000 g/mol, a CY-a parameter at 190° C. in a range from about 0.2 to about 0.4, a number of short chain branches (SCB's) per 1000 total carbon atoms of the polymer at Mz that is greater than at Mn; and an ATREF profile characterized by a first peak and second peak, with the second peak at a temperature from about 92 to about 102° C., and the first peak at a temperature from about 18 to about 36° C. less than that of the second peak; and from about 0.1 to about 8 wt. % of the polymer eluted below a temperature of 40° C., greater than about 45 wt. % of the polymer eluted between 40 and 76° C., less than about 36 wt. % of the polymer eluted between 76 and 86° C., and from about 1 to about 26 wt. % of the polymer eluted above a temperature of 86° C.

Aspect 2. The polymer defined in aspect 1, wherein the ethylene polymer has a density in any range disclosed herein, e.g., from about 0.895 to about 0.928 g/cm$^3$, from about 0.902 to about 0.928 g/cm$^3$, from about 0.902 to about 0.922 g/cm$^3$, from about 0.895 to about 0.925 g/cm$^3$, from about 0.905 to about 0.925 g/cm$^3$, etc.

Aspect 3. The polymer defined in aspect 1 or 2, wherein the ethylene polymer has a ratio of Mw/Mn in any range disclosed herein, e.g., from about 3 to about 6, from about 3.2 to about 6.5, from about 3.5 to about 5.5, from about 3.2 to about 6.2, from about 3.5 to about 6.2, from about 3.2 to about 5.8, from about 3.5 to about 6, etc.

Aspect 4. The polymer defined in any one of aspects 1-3, wherein the ethylene polymer has a Mz in any range disclosed herein, e.g., from about 200,000 to about 600,000 g/mol, from about 210,000 to about 575,000 g/mol, from about 200,000 to about 525,000 g/mol, from about 210,000 to about 600,000 g/mol, from about 250,000 to about 550,000 g/mol, etc.

Aspect 5. The polymer defined in any one of aspects 1-4, wherein the ethylene polymer has a CY-a parameter in any range disclosed herein, e.g., from about 0.2 to about 0.39, from about 0.22 to about 0.39, from about 0.24 to about 0.39, from about 0.2 to about 0.38, from about 0.24 to about 0.38, etc.

Aspect 6. The polymer defined in any one of aspects 1-5, wherein the ethylene polymer has a number of short chain branches (SCB's) per 1000 total carbon atoms of the polymer at Mz that is greater than at Mw, and/or a number of short chain branches (SCB's) per 1000 total carbon atoms of the polymer at Mw that is greater than at Mn (a reverse short chain branching distribution or increasing comonomer distribution).

Aspect 7. The polymer defined in any one of aspects 1-6, wherein the temperature of the second peak is in any range disclosed herein, e.g., from about 93 to about 102° C., from about 92 to about 100° C., from about 93 to about 100° C., from about 94 to about 99° C., etc.

Aspect 8. The polymer defined in any one of aspects 1-7, wherein the temperature of the first peak is in any range disclosed herein, e.g., from about 58 to about 82° C., from about 60 to about 80° C., from about 61 to about 79° C., from about 62 to about 78° C., etc.

Aspect 9. The polymer defined in any one of aspects 1-8, wherein the difference between the temperatures of the first peak and the second peak ($\Delta T$) is in any range disclosed herein, e.g., from about 19 to about 36° C., from about 18 to about 35° C., from about 20 to about 34° C., etc.

Aspect 10. The polymer defined in any one of aspects 1-9, wherein the amount of the polymer eluted below a temperature of 40° C. is in any range disclosed herein, e.g., from about 0.5 to about 7 wt. %, from about 1 to about 8 wt. %, from about 1 to about 7 wt. %, from about 2 to about 6 wt. %, etc.

Aspect 11. The polymer defined in any one of aspects 1-10, wherein the amount of the polymer eluted between 40 and 76° C. is in any range disclosed herein, e.g., greater than or equal to about 47 wt. %, greater than or equal to about 50 wt. %, from about 46 to about 90 wt. %, from about 46 to about 86 wt. %, from about 48 to about 88 wt. %, from about 50 to about 86 wt. %, etc.

Aspect 12. The polymer defined in any one of aspects 1-11, wherein the amount of the polymer eluted between 76 and 86° C. is in any range disclosed herein, e.g., less than or equal to about 35 wt. %, less than or equal to about 33 wt. %, from about 2 to about 35 wt. %, from about 4 to about 35 wt. %, from about 3 to about 34 wt. %, from about 5 to about 33 wt. %, etc.

Aspect 13. The polymer defined in any one of aspects 1-12, wherein the amount of the polymer eluted above a temperature of 86° C. is in any range disclosed herein, e.g., from about 1 to about 25 wt. %, from about 1 to about 24 wt. %, from about 2 to about 26 wt. %, from about 2 to about 25 wt. %, from about 3 to about 24 wt. %, etc.

Aspect 14. The polymer defined in any one of aspects 1-13, wherein the ethylene polymer contains less than 0.01 long chain branches (LCB's), less than 0.009 LCB's, less than 0.008 LCB's, less than 0.007 LCB's, less than 0.005 LCB's, or less than 0.003 LCB's, per 1000 total carbon atoms.

Aspect 15. The polymer defined in any one of aspects 1-14, wherein the ethylene polymer has an IB parameter in any range disclosed herein, e.g., from about 1.1 to about 1.4, from about 1.15 to about 1.4, from about 1.1 to about 1.35, from about 1.15 to about 1.35, from about 1.17 to about 1.33, etc.

Aspect 16. The polymer defined in any one of aspects 1-15, wherein the ethylene polymer has a melt index (MI) in any range disclosed herein, e.g., from about 0.2 to about 10 g/10 min, from about 0.3 to about 6 g/10 min, from about 0.5 to about 5 g/10 min, from about 0.5 to about 4 g/10 min, etc.

Aspect 17. The polymer defined in any one of aspects 1-16, wherein the ethylene polymer has a ratio of HLMI/MI in any range disclosed herein, e.g., from about 20 to about 50, from about 25 to about 45, from about 28 to about 42, from about 30 to about 40, etc.

Aspect 18. The polymer defined in any one of aspects 1-17, wherein the ethylene polymer has a Mw in any range disclosed herein, e.g., from about 80,000 to about 200,000 g/mol, from about 80,000 to about 180,000 g/mol, from about 80,000 to about 160,000 g/mol, from about 85,000 to about 170,000 g/mol, etc.

Aspect 19. The polymer defined in any one of aspects 1-18, wherein the ethylene polymer has a ratio of Mz/Mw in any range disclosed herein, e.g., from about 2 to about 6, from about 2 to about 5, from about 2 to about 4, from about 2.2 to about 5, from about 2.4 to about 5.5, from about 2.4 to about 4.2, etc.

Aspect 20. The polymer defined in any one of aspects 1-19, wherein the ethylene polymer has a Mn in any range disclosed herein, e.g., from about 10,000 to about 40,000 g/mol, from about 15,000 to about 35,000 g/mol, from about 17,000 to about 36,000 g/mol, from about 17,000 to about 33,000 g/mol, etc.

Aspect 21. The polymer defined in any one of aspects 1-20, wherein the ethylene polymer has a zero-shear viscosity in any range disclosed herein, e.g., from about 2000 to about 35,000 Pa-sec, from about 2000 to about 30,000 Pa-sec, from about 2000 to about 20,000 Pa-sec, from about 3000 to about 25,000 Pa-sec, from about 3000 to about 18,000 Pa-sec, etc.

Aspect 22. The polymer defined in any one of aspects 1-21, wherein the ethylene polymer has a unimodal molecular weight distribution (single peak).

Aspect 23. The polymer defined in any one of aspects 1-22, wherein the ethylene polymer is a single reactor product, e.g., not a post-reactor blend of two polymers, for instance, having different molecular weight characteristics.

Aspect 24. The polymer defined in any one of aspects 1-23, wherein the ethylene polymer comprises an ethylene/α-olefin copolymer and/or an ethylene homopolymer.

Aspect 25. The polymer defined in any one of aspects 1-24, wherein the ethylene polymer comprises an ethylene/1-butene copolymer, an ethylene/1-hexene copolymer, an ethylene/1-octene copolymer, an ethylene homopolymer, or any combination thereof.

Aspect 26. The polymer defined in any one of aspects 1-25, wherein the ethylene polymer comprises an ethylene/1-hexene copolymer.

Aspect 27. An article comprising the ethylene polymer defined in any one of aspects 1-26.

Aspect 28. An article comprising the ethylene polymer defined in any one of aspects 1-26, wherein the article is an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product, outdoor play equipment, a pipe, a sheet or tape, a toy, or a traffic barrier.

Aspect 29. A film comprising the ethylene polymer defined in any one of aspects 1-26.

Aspect 30. The film defined in aspect 29, wherein the film is a blown or cast film having an average thickness in any range disclosed herein, e.g., from about 0.4 to about 20 mils, from about 0.5 to about 8 mils, from about 0.8 to about 5 mils, from about 0.7 to about 2 mils, from about 0.7 to about 1.5 mils, etc.

Aspect 31. A catalyst composition comprising:
catalyst component I comprising any suitable half-metallocene titanium compound or any half-metallocene titanium compound disclosed herein, catalyst component II comprising any suitable bridged metallocene compound or any bridged metallocene compound disclosed herein, any suitable activator or any activator disclosed herein, and optionally, any suitable co-catalyst or any co-catalyst disclosed herein.

Aspect 32. The composition defined in aspect 31, wherein catalyst component II comprises a bridged zirconium or hafnium based metallocene compound.

Aspect 33. The composition defined in aspect 31, wherein catalyst component II comprises a bridged zirconium or hafnium based metallocene compound with an alkenyl substituent.

Aspect 34. The composition defined in aspect 31, wherein catalyst component II comprises a bridged zirconium or hafnium based metallocene compound with an alkenyl substituent and a fluorenyl group.

Aspect 35. The composition defined in aspect 31, wherein catalyst component II comprises a bridged zirconium or hafnium based metallocene compound with a cyclopentadienyl group and a fluorenyl group, and with an alkenyl substituent on the bridging group and/or on the cyclopentadienyl group.

Aspect 36. The composition defined in aspect 31, wherein catalyst component II comprises a bridged metallocene compound having an alkyl and/or an aryl group substituent on the bridging group.

Aspect 37. The composition defined in any one of aspects 31-36, wherein catalyst component I comprises a half-metallocene titanium compound with a cyclopentadienyl group.

Aspect 38. The composition defined in any one of aspects 31-36, wherein catalyst component I comprises a half-metallocene titanium compound with an indenyl group.

Aspect 39. The composition defined in any one of aspects 31-38, wherein the activator comprises an activator-support, an aluminoxane compound, an organoboron or organoborate compound, an ionizing ionic compound, or any combination thereof.

Aspect 40. The composition defined in any one of aspects 31-39, wherein the activator comprises an aluminoxane compound.

Aspect 41. The composition defined in any one of aspects 31-39, wherein the activator comprises an organoboron or organoborate compound.

Aspect 42. The composition defined in any one of aspects 31-39, wherein the activator comprises an ionizing ionic compound.

Aspect 43. The composition defined in any one of aspects 31-39, wherein the activator comprises an activator-support, the activator-support comprising any solid oxide treated with any electron-withdrawing anion disclosed herein.

Aspect 44. The composition defined in any one of aspects 31-39, wherein the activator comprises fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or any combination thereof.

Aspect 45. The composition defined in any one of aspects 31-39, wherein the activator comprises fluorided alumina, sulfated alumina, fluorided silica-alumina, sulfated silica-alumina, fluorided silica-coated alumina, sulfated silica-coated alumina, or any combination thereof.

Aspect 46. The composition defined in any one of aspects 31-39, wherein the activator comprises a fluorided solid oxide and/or a sulfated solid oxide.

Aspect 47. The composition defined in any one of aspects 43-46, wherein the activator further comprises any metal or metal ion disclosed herein, e.g., zinc, nickel, vanadium, titanium, silver, copper, gallium, tin, tungsten, molybdenum, zirconium, or any combination thereof.

Aspect 48. The composition defined in any one of aspects 31-47, wherein the catalyst composition comprises a co-catalyst, e.g., any suitable co-catalyst.

Aspect 49. The composition defined in any one of aspects 31-48, wherein the co-catalyst comprises any organoaluminum compound and/or organozinc compound disclosed herein.

Aspect 50. The composition defined in aspect 49, wherein the organoaluminum compound comprises trimethylaluminum, triethylaluminum, triisobutylaluminum, or a combination thereof.

Aspect 51. The composition defined in any one of aspects 43-50, wherein the catalyst composition comprises catalyst component I, catalyst component II, a solid oxide treated with an electron-withdrawing anion, and an organoaluminum compound.

Aspect 52. The composition defined in any one of aspects 43-51, wherein the catalyst composition is substantially free of aluminoxane compounds, organoboron or organoborate compounds, ionizing ionic compounds, or combinations thereof.

Aspect 53. The composition defined in any one of aspects 31-52, wherein a weight ratio of catalyst component I to catalyst component II in the catalyst composition is in any range disclosed herein, e.g., from about 10:1 to about 1:10, from about 5:1 to about 1:5, from about 2:1 to about 1:2, etc.

Aspect 54. The composition defined in any one of aspects 31-53, wherein the catalyst composition is produced by a process comprising contacting, in any order, catalyst component I, catalyst component II, and the activator.

Aspect 55. The composition defined in any one of aspects 31-53, wherein the catalyst composition is produced by a process comprising contacting, in any order, catalyst component I, catalyst component II, the activator, and the co-catalyst.

Aspect 56. The composition defined in any one of aspects 31-55, wherein a catalyst activity of the catalyst composition is in any range disclosed herein, e.g., from about 500 to about 10,000, from about 750 to about 7,500, from about 1,000 to about 5,000 grams, etc., of ethylene polymer per gram of activator-support per hour, under slurry polymerization conditions, with a triisobutylaluminum co-catalyst, using isobutane as a diluent, and with a polymerization temperature of 80° C. and a reactor pressure of 320 psig.

Aspect 57. An olefin polymerization process, the process comprising contacting the catalyst composition defined in any one of aspects 31-56 with an olefin monomer and an olefin comonomer in a polymerization reactor system under polymerization conditions to produce an olefin polymer.

Aspect 58. The process defined in aspect 57, wherein the olefin monomer comprises any olefin monomer disclosed herein, e.g., any $C_2$-$C_{20}$ olefin.

Aspect 59. The process defined in aspect 57 or 58, wherein the olefin monomer and the olefin comonomer independently comprise a $C_2$-$C_{20}$ alpha-olefin.

Aspect 60. The process defined in any one of aspects 57-59, wherein the olefin monomer comprises ethylene.

Aspect 61. The process defined in any one of aspects 57-60, wherein the catalyst composition is contacted with ethylene and an olefin comonomer comprising a $C_3$-$C_{10}$ alpha-olefin.

Aspect 62. The process defined in any one of aspects 57-61, wherein the catalyst composition is contacted with ethylene and an olefin comonomer comprising 1-butene, 1-hexene, 1-octene, or a mixture thereof.

Aspect 63. The process defined in any one of aspects 57-59, wherein the olefin monomer comprises propylene.

Aspect 64. The process defined in any one of aspects 57-63, wherein the polymerization reactor system comprises a batch reactor, a slurry reactor, a gas-phase reactor, a solution reactor, a high pressure reactor, a tubular reactor, an autoclave reactor, or a combination thereof.

Aspect 65. The process defined in any one of aspects 57-64, wherein the polymerization reactor system comprises a slurry reactor, a gas-phase reactor, a solution reactor, or a combination thereof.

Aspect 66. The process defined in any one of aspects 57-65, wherein the polymerization reactor system comprises a loop slurry reactor.

Aspect 67. The process defined in any one of aspects 57-66, wherein the polymerization reactor system comprises a single reactor.

Aspect 68. The process defined in any one of aspects 57-66, wherein the polymerization reactor system comprises 2 reactors.

Aspect 69. The process defined in any one of aspects 57-66, wherein the polymerization reactor system comprises more than 2 reactors.

Aspect 70. The process defined in any one of aspects 57-69, wherein the olefin polymer comprises any olefin polymer disclosed herein.

Aspect 71. The process defined in any one of aspects 57-62 and 64-70, wherein the olefin polymer comprises an ethylene homopolymer, an ethylene/1-butene copolymer, an ethylene/1-hexene copolymer, and/or an ethylene/1-octene copolymer.

Aspect 72. The process defined in any one of aspects 57-62 and 64-70, wherein the olefin polymer comprises an ethylene/1-hexene copolymer.

Aspect 73. The process defined in any one of aspects 57-59 and 63-70, wherein the olefin polymer comprises a polypropylene homopolymer or a propylene-based copolymer.

Aspect 74. The process defined in any one of aspects 57-73, wherein the polymerization conditions comprise a polymerization reaction temperature in a range from about 60° C. to about 120° C. and a reaction pressure in a range from about 200 to about 1000 psig (about 1.4 to about 6.9 MPa).

Aspect 75. The process defined in any one of aspects 57-74, wherein the polymerization conditions are substantially constant, e.g., for a particular polymer grade.

Aspect 76. The process defined in any one of aspects 57-75, wherein no hydrogen is added to the polymerization reactor system.

Aspect 77. The process defined in any one of aspects 57-75, wherein hydrogen is added to the polymerization reactor system.

Aspect 78. The process defined in any one of aspects 57-77, wherein the olefin polymer produced is defined in any one of aspects 1-26.

Aspect 79. An olefin polymer produced by the olefin polymerization process defined in any one of aspects 57-77.

Aspect 80. An ethylene polymer defined in any one of aspects 1-26 produced by the process defined in any one of aspects 57-77.

Aspect 81. An article (e.g., a blown film) comprising the polymer defined in any one of aspects 79-80.

Aspect 82. A method or forming or preparing an article of manufacture comprising an olefin polymer, the method comprising (i) performing the olefin polymerization process defined in any one of aspects 57-77 to produce an olefin polymer (e.g., the ethylene polymer of any one of aspects 1-26), and (ii) forming the article of manufacture comprising the olefin polymer, e.g., via any technique disclosed herein.

Aspect 83. The article defined in any one of aspects 81-82, wherein the article is an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product, outdoor play equipment, a pipe, a sheet or tape, a toy, or a traffic barrier.

We claim:
1. An ethylene polymer having:
a density in a range from about 0.89 to about 0.93 g/cm$^3$;
a ratio of Mw/Mn in a range from about 3 to about 6.5;
a Mz in a range from about 200,000 to about 650,000 g/mol;
a CY-a parameter at 190° C. in a range from about 0.2 to about 0.4;
a number of short chain branches (SCB's) per 1000 total carbon atoms of the polymer at Mz that is greater than at Mn; and
the following polymer fractions in an ATREF test:
from about 0.1 to about 8 wt. % of the polymer eluted below a temperature of 40° C.;
greater than about 45 wt. % of the polymer eluted between 40 and 76° C.;
less than about 36 wt. % of the polymer eluted between 76 and 86° C.; and
from about 1 to about 26 wt. % of the polymer eluted above a temperature of 86° C.
2. An article of manufacture comprising the polymer of claim 1.
3. The polymer of claim 1, wherein:
the density is in a range from about 0.902 to about 0.922 g/cm$^3$;
the ratio of Mw/Mn is in a range from about 3.5 to about 6;
the Mz is in a range from about 210,000 to about 575,000 g/mol; and
the CY-a parameter at 190° C. is in a range from about 0.24 to about 0.38.
4. The polymer of claim 3, wherein:
the ethylene polymer has a unimodal molecular weight distribution; and
the ethylene polymer comprises an ethylene/1-butene copolymer, an ethylene/1-hexene copolymer, an ethylene/1-octene copolymer, or a combination thereof.
5. A blown or cast film comprising the polymer of claim 4, wherein the film has an average thickness in a range from about 0.5 to about 8 mils.
6. The polymer of claim 1, wherein:
from about 0.5 to about 7 wt. % of the polymer is eluted below a temperature of 40° C.;
from about 46 to about 90 wt. % of the polymer is eluted between 40 and 76° C.;
from about 4 to about 35 wt. % of the polymer is eluted between 76 and 86° C.; and
from about 2 to about 25 wt. % of the polymer is eluted above a temperature of 86° C.
7. An article of manufacture comprising the polymer of claim 6.
8. The polymer of claim 1, wherein the ethylene polymer has:
a Mw in a range from about 80,000 to about 180,000 g/mol; and
an D3 parameter in a range from about 1.1 to about 1.4.
9. The polymer of claim 1, wherein the ethylene polymer has:
a melt index in a range from about 0.5 to about 5 g/10 min; and
a ratio of HLMI/MI in a range from about 28 to about 42.
10. The polymer of claim 1, wherein the ethylene polymer contains less than 0.008 long chain branches per 1000 total carbon atoms.
11. The polymer of claim 1, wherein the ethylene polymer is further characterized by an ATREF profile having a first peak and a second peak, wherein:
the second peak is at a temperature from about 92 to about 102° C.; and
the first peak is at a temperature from about 18 to about 36° C. less than that of the second peak.
12. An article of manufacture comprising the polymer of claim 11.
13. An ethylene polymer having:
a density in a range from about 0.89 to about 0.93 g/cm$^3$;
a ratio of Mw/Mn in a range from about 3 to about 6.5;
a Mz in a range from about 200,000 to about 650,000 g/mol;
a CY-a parameter at 190° C. in a range from about 0.2 to about 0.4;
a number of short chain branches (SCB's) per 1000 total carbon atoms of the polymer at Mz that is greater than at Mn; and
an ATREF profile characterized by a first peak and a second peak, with the second peak at a temperature from about 92 to about 102° C., and the first peak at a temperature from about 18 to about 36° C. less than that of the second peak.
14. The polymer of claim 13, wherein the first peak is at a temperature in a range from about 60 to about 80° C.

15. The polymer of claim 13, wherein the first peak is at a temperature from about 20 to about 34° C. less than that of the second peak.

16. The polymer of claim 13, wherein the second peak is at a temperature in a range from about 93 to about 100° C.

17. The polymer of claim 13, wherein the ethylene polymer has:
- a Mw in a range from about 80,000 to about 180,000 g/mol;
- an D3 parameter in a range from about 1.1 to about 1.4;
- a melt index in a range from about 0.5 to about 5 g/10 min; and
- a ratio of HLMI/MI in a range from about 28 to about 42.

18. An article of manufacture comprising the polymer of claim 17.

19. The polymer of claim 1, wherein the ethylene polymer is an ethylene/α-olefin copolymer further characterized by:
- a density in a range from about 0.902 to about 0.928 g/cm$^3$;
- a ratio of Mw/Mn is in a range from about 3.2 to about 5.8;
- a Mz in a range from about 210,000 to about 575,000 g/mol; and
- a ratio of HLMI/MI in a range from about 25 to about 45.

20. The polymer of claim 13, wherein the ethylene polymer is an ethylene/α-olefin copolymer further characterized by:
- a density in a range from about 0.902 to about 0.928 g/cm$^3$;
- a ratio of Mw/Mn is in a range from about 3.2 to about 5.8;
- a Mz in a range from about 210,000 to about 575,000 g/mol; and
- a ratio of HLMI/MI in a range from about 25 to about 45.

* * * * *

UNITED STATES PATENT AND TRADEMARK OFFICE
CERTIFICATE OF CORRECTION

PATENT NO. : 10,358,506 B2  
APPLICATION NO. : 15/723225  
DATED : July 23, 2019  
INVENTOR(S) : Errun Ding et al.

Page 1 of 1

It is certified that error appears in the above-identified patent and that said Letters Patent is hereby corrected as shown below:

In the Specification

Column 27, Line 26, replace "D3" with --IB--

In the Claims

Claim 8, Column 40, Line 33, replace "D3" with --IB--

Claim 17, Column 41, Line 11, replace "D3" with --IB--

Signed and Sealed this  
Thirteenth Day of July, 2021

Drew Hirshfeld  
*Performing the Functions and Duties of the*  
*Under Secretary of Commerce for Intellectual Property and*  
*Director of the United States Patent and Trademark Office*